US008705049B2

(12) United States Patent
Honma et al.

(10) Patent No.: US 8,705,049 B2
(45) Date of Patent: Apr. 22, 2014

(54) THREE-DIMENSIONAL SHAPE MEASURING APPARATUS, THREE-DIMENSIONAL SHAPE MEASURING METHOD, AND THREE-DIMENSIONAL SHAPE MEASURING PROGRAM

(75) Inventors: Yuki Honma, Joyo (JP); Daisuke Mitsumoto, Nagaokakyo (JP); Sunao Takemura, Ibaraki (JP)

(73) Assignee: OMRON Corporation, Kyoto (JP)

( * ) Notice: Subject to any disclaimer, the term of this patent is extended or adjusted under 35 U.S.C. 154(b) by 238 days.

(21) Appl. No.: 13/256,965

(22) PCT Filed: Mar. 26, 2010

(86) PCT No.: PCT/JP2010/002193
§ 371 (c)(1),
(2), (4) Date: Oct. 6, 2011

(87) PCT Pub. No.: WO2010/113450
PCT Pub. Date: Oct. 7, 2010

(65) Prior Publication Data
US 2012/0019836 A1 Jan. 26, 2012

(30) Foreign Application Priority Data

Apr. 3, 2009 (JP) ................................. 2009-091413

(51) Int. Cl.
*G01B 11/30* (2006.01)
*G01B 11/24* (2006.01)
(52) U.S. Cl.
USPC ............................ 356/603; 356/601; 356/610
(58) Field of Classification Search
USPC ..................... 356/237.1–241.6, 242.1–243.8, 356/426–431, 600–640
See application file for complete search history.

(56) References Cited

U.S. PATENT DOCUMENTS 4,794,550 A * 12/1988 Greivenkamp, Jr. .......... 702/167
5,953,448 A * 9/1999 Liang ............................. 382/154

(Continued)

FOREIGN PATENT DOCUMENTS

JP  5-340724 A   12/1993
JP  11-351858 A  12/1999

(Continued)

OTHER PUBLICATIONS

M. Fujigaki et al., "Grating Projecting Method on Shape Measurement for Continuous Object by Multiple Linear Sensors," Proceedings of JSPE Autumn Meeting, the Japan Society for Precision Engineering, pp. 1061-1062, 2004, 2 pages.

(Continued)

*Primary Examiner* — Gregory J Toatley
*Assistant Examiner* — Jarreas C Underwood
(74) *Attorney, Agent, or Firm* — Osha Liang LLP

(57) ABSTRACT

A three-dimensional shape measuring apparatus measures by analyzing an optical pattern projected to the measurement target, and luminance of the optical pattern. The apparatus includes a mounting stage having a reference plane of a height of the measurement target, a measurement head that projects the optical pattern, to the measurement target and reference plane, to capture images of the optical patterns, and a displacement portion displaces the measurement head in a height direction. A phase computing portion computes a phase of the optical pattern in a certain pixel included in the captured image. A height computing portion computes a height of the measurement target based on the phase, and a feed amount computing portion computes a displacement amount based on the height. The height computing portion computes the height based on the phase and corrects the height based on the displacement amount, thereby computing the height of the measurement target.

10 Claims, 15 Drawing Sheets

(56) References Cited

U.S. PATENT DOCUMENTS

| | | | |
|---|---|---|---|
| 6,788,210 B1* | 9/2004 | Huang et al. | 340/612 |
| 6,937,350 B2* | 8/2005 | Shirley | 356/630 |
| 2007/0090189 A1* | 4/2007 | Suwa et al. | 235/454 |
| 2008/0117438 A1* | 5/2008 | Quirion et al. | 356/610 |
| 2010/0195114 A1 | 8/2010 | Mitsumoto et al. | |

FOREIGN PATENT DOCUMENTS

| | | |
|---|---|---|
| JP | 2002-214147 A | 7/2002 |
| JP | 2002-286433 A | 10/2002 |
| JP | 2004-117186 A | 4/2004 |
| JP | 2005-300512 A | 10/2005 |
| JP | 2007-114071 A | 5/2007 |
| JP | 2009-031150 A | 2/2009 |
| WO | 2009/016924 A1 | 2/2009 |

OTHER PUBLICATIONS

International Search Report issued in PCT/JP2010/002193, dated May 18, 2010, with translation, 5 pages.

* cited by examiner

Imaging range at one time
Main scanning direction
Pattern illumination image
Sub-scanning direction Variation in illuminance in reference plane Variation in illuminance in protrusion

- ○ Center of measurement range of next line
- ● Board measurement position

Conveyance direction

Conveyance direction

US 8,705,049 B2

THREE-DIMENSIONAL SHAPE MEASURING APPARATUS, THREE-DIMENSIONAL SHAPE MEASURING METHOD, AND THREE-DIMENSIONAL SHAPE MEASURING PROGRAM

CROSS-REFERENCE TO RELATED APPLICATIONS

The present application claims priority from Japanese Patent Application No. 2009-091413, filed Apr. 3, 2009. The content of the priority application is hereby incorporated by reference in its entirety.

BACKGROUND OF INVENTION

1. Technical Field

One or more embodiments of the present invention relate to a three-dimensional shape measuring apparatus, a three-dimensional shape measuring method, and a three-dimensional shape measuring program for analyzing an optical pattern, which is projected to a measurement target, to measure a three-dimensional shape of the measurement target.

2. Background Art

As means for obtaining three-dimensional shape information on a target object through an image analysis, there is a method for projecting an optical pattern to a measurement target existing in a predetermined imaging visual field to analyze a deformation amount of the optical pattern changed according to a three-dimensional shape of the measurement target. A light cutting method, a spatial code method, and a fringe analysis method can be cited as typical methods. These methods are based on a principle of a triangulation. Among others, various techniques such as a spatial fringe analysis and a temporal fringe analysis are proposed with respect to the fringe analysis method, and the fringe analysis method is known as a technique of obtaining high measurement accuracy (Patent Documents 1 to 3 and Non-Patent Document 1).

In the case of the above method, a geometrical positional relationship among a phototransmitting device that projects the optical pattern, a reference plane that is a plane on which the measurement target is placed, and an imaging device that captures an image of the measurement target affects the measurement accuracy in a height position. This point will be described with reference to FIG. 15.

FIG. 15 is a view illustrating the principle of the triangulation. For the convenience of explanation, a plane Ph having a height h from a reference plane P0 is observed with an imaging device Cc having an optical axis perpendicular to the reference plane P0. A phototransmitting device Cp is disposed at the same level as the imaging device Cc when viewed from the reference plane P0, and the optical pattern is projected to a position of a point O on the reference plane P0.

In the case where the plane Ph that is parallel with the reference plane P0 and separated by the height h is observed, the optical pattern directed to the point O intersects a point P. At this point, when the plane Ph is viewed from the imaging device Cc, the optical pattern projected to the point P0 is observed in a position P having a distance PQ from an optical axis (Z-axis). This position deviation PQ emerges as a phase difference of the optical pattern. When the phase difference can be computed, the height h can be computed by the following equation (1).

[Formula 1]

$$h = \frac{L}{d} \cdot \overline{PQ} \tag{1}$$

(Where $\overline{PQ}$ expresses a distance between PQ, namely, a phase difference. In addition, d expresses a distance between centers of optical axes of an imaging portion Cc and a phototransmitting portion Cp, and L expresses a distance from the imaging portion Cc to a reference plane, and the distance d and the distance L are well-known values.)

Patent Document 1: Japanese Unexamined Patent Publication No. 2002-286433 (published on Oct. 3, 2002)
Patent Document 2: Japanese Unexamined Patent Publication No. 2004-117186 (published on Apr. 15, 2004)
Patent Document 3: Japanese Unexamined Patent Publication No. 2007-114071 (published on May 10, 2007)
Patent Document 4: Japanese Unexamined Patent Publication No. 2002-214147 (published on Jul. 31, 2002)
Patent Document 5: Japanese Unexamined Patent Publication No. 2005-300512 (published on Oct. 27, 2005)
Non-Patent Document 1: Fujigaki, et al., "Grating Projecting Method on Shape Measurement for Continuous Object by Multiple Linear Sensors", Proceedings of JSPE Autumn Meeting, the Japan Society for Precision Engineering, pp. 1061-1062, 2004

SUMMARY OF THE INVENTION

However, usually the phase difference is computed as a remainder of a division in which the original phase difference is divided by $2\pi$. Therefore, a range of a measurable phase difference is restricted to $2\pi$, and a range (measurement range) of a measurable height is restricted.

Therefore, some methods for expanding the measurable height have been proposed. For example, there is a method for lengthening a period of the optical pattern. When the period is lengthened, the position deviation PQ corresponding to one period is lengthened to expand the measurement range.

However, in the above method, when the phase difference has the same resolution, resolution (observable minimum value) of the position deviation PQ is lengthened to lengthen the resolution of the height. That is, accuracy of the height is lowered. It may be necessary to improve the resolution of the phase difference. However, an expensive optical unit is required, and calibration becomes more troublesome.

There is another method for roughly measuring a shape of the measurement target using a new displacement sensor and expanding the measurable height by changing the measurement range based on the shape. However, in this case, it is necessary to dispose the new displacement sensor to perform the calibration. Therefore, cost and labor hour for the measurement are increased.

One or more embodiments of the present invention may provide a three-dimensional shape measuring apparatus that can simply expand the measurable height while maintaining the measurement range.

A three-dimensional shape measuring apparatus according to one or more embodiments of the present invention is a three-dimensional shape measuring apparatus that measures a three-dimensional shape of a measurement target by analyzing an optical pattern projected to the measurement target, luminance of the optical pattern periodically changing according to a position, and the three-dimensional shape measuring apparatus includes: a mounting stage to which the measurement target is attached, the mounting stage having a reference plane that becomes a reference of a height of the measurement target; a measurement head that projects the optical pattern to the measurement target and the reference plane and captures images of the projected optical patterns; a displacement portion that displaces at least one of the mounting stage and the measurement head in a height direction of the measurement target; phase computing means for computing a phase of the optical pattern in a certain pixel included in the image captured by the measurement head; height computing means for computing a height of the measurement target based on the phase computed by the phase computing means; and displacement portion control means for controlling the displacement portion based on the height of the measurement target computed by the height computing means, wherein the height computing means computes the height based on the phase computed by the phase computing means, and corrects the computed height based on a displacement amount displaced by the displacement portion from the reference plane of the mounting stage to the height of the measurement head, thereby computing the height of the measurement target.

A three-dimensional shape measuring method according to one or more embodiments of the present invention for a three-dimensional shape measuring apparatus is a three-dimensional shape measuring method that measures a three-dimensional shape of a measurement target by analyzing an optical pattern projected to the measurement target, luminance of the optical pattern periodically changing according to a position, and the three-dimensional shape measuring method includes: a phase computing step of projecting the optical pattern to the measurement target and a reference plane included in a mounting stage to which the measurement target is attached, the reference plane becoming a reference of a height of the measurement target, and computing a phase of the optical pattern in a certain pixel included in the image captured by a measurement head, the measurement head capturing an image of the projected optical pattern; a height computing step of computing a height of the measurement target based on the phase computed in the phase computing step; and a displacement portion control step of controlling a displacement portion, which displaces at least one of the mounting stage and the measurement head in a height direction of the measurement target, based on the height of the measurement target, the height of the measurement target being computed in the height computing step, wherein, in the height computing step, the height is computed based on the phase computed in the phase computing step, and the computed height is corrected based on a displacement amount displaced by a displacement portion from the reference plane of the mounting stage to the height of the measurement head, thereby computing the height of the measurement target.

According to the above configuration and method, the height is computed based on the phase of the optical pattern in a certain pixel, and the computed height is corrected based on the displacement amount displaced by the displacement portion from the reference plane of the mounting stage to the height of the measurement head, thereby computing the height of the measurement target. At least one of the mounting stage and the measurement head is displaced in the height direction of the measurement target based on the computed height of the measurement target.

Generally, the distance (height) in the height direction from the reference plane of the mounting stage to the measurement head can be adjusted in order to calibrate the three-dimensional shape measuring apparatus. That is, generally a height adjusting mechanism that adjusts the measurement head and/or the mounting stage in the height direction is provided in the three-dimensional shape measuring apparatus.

The height adjusting mechanism is changed to the displacement portion that is controlled so as to displace the measurement head and/or the mounting stage in the height direction based on the height of the measurement target, which allows the measurement range to be easily displaced in the height direction. The displacement portion is calibrated along with the conventional calibration, so that the increase in labor hour of the calibration can be suppressed.

The height computed based on the phase is corrected based on the displacement amount displaced by the displacement portion, which allows the height of the measurement target to be correctly computed without providing the new sensor that measures the height. Accordingly, one or more embodiments of the present invention can simply expand the measurable height while maintaining the measurement range.

The measurement target may be attached to the reference plane, or the measurement target may be attached while separated from the reference plane. Desirably, the displacement portion displaces the measurement head in the height direction. However, the mounting stage may be displaced in the height direction, or both the measurement head and the mounting stage may be displaced in the height direction.

A three-dimensional shape measuring program can cause a computer to execute each step in the three-dimensional shape measuring apparatus by a three-dimensional shape measuring program. The three-dimensional shape measuring program can be executed on any computer by storing the three-dimensional shape measuring program in a computer-readable recording medium.

As described above, in the three-dimensional shape measuring apparatus according to one or more embodiments of the present invention, the conventional height adjusting mechanism is changed to the displacement portion that is controlled so as to displace the measurement head and/or the mounting stage in the height direction based on the height of the measurement target, so that the measurement range can easily be displaced in the height direction to suppress the labor hour of the calibration. Additionally, the height computed based on the phase is corrected based on the displacement amount displaced by the displacement portion, so that the height of the measurement target can correctly be computed without providing the new sensor that measures the height. Therefore, advantageously the measurable height can simply be expanded while the measurement range is maintained.

These and other features and advantages of one or more embodiments of the present invention will be apparent from the following description. The advantages of one or more embodiments of the present invention will be apparent from the following description with reference to the accompanying drawings.

DETAILED DESCRIPTION

Figure 1:
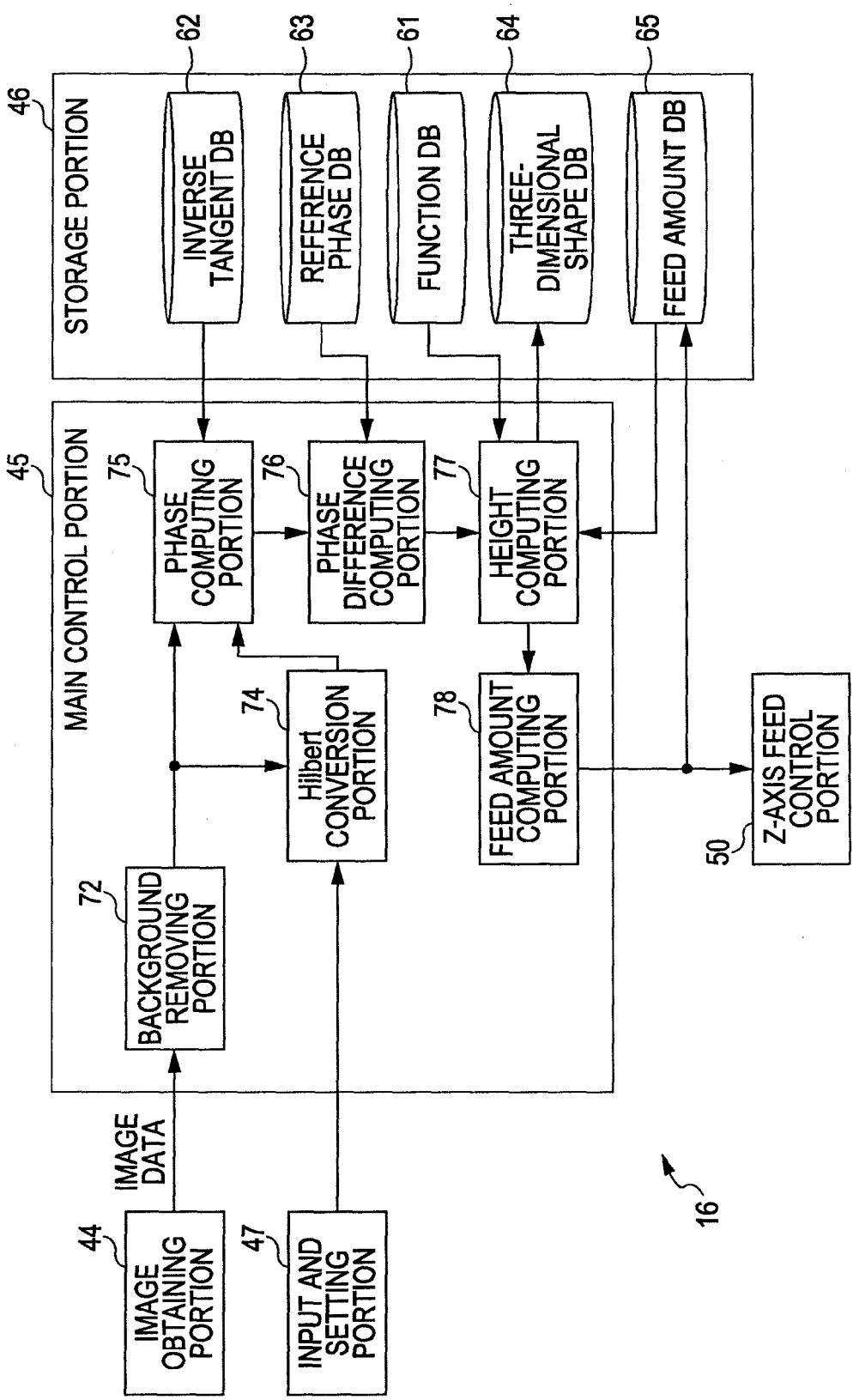
FIG. 1 is a block diagram illustrating a configuration of a main part of a control unit of a three-dimensional shape measuring system according to one or more embodiments of the present invention.
Figure 2:
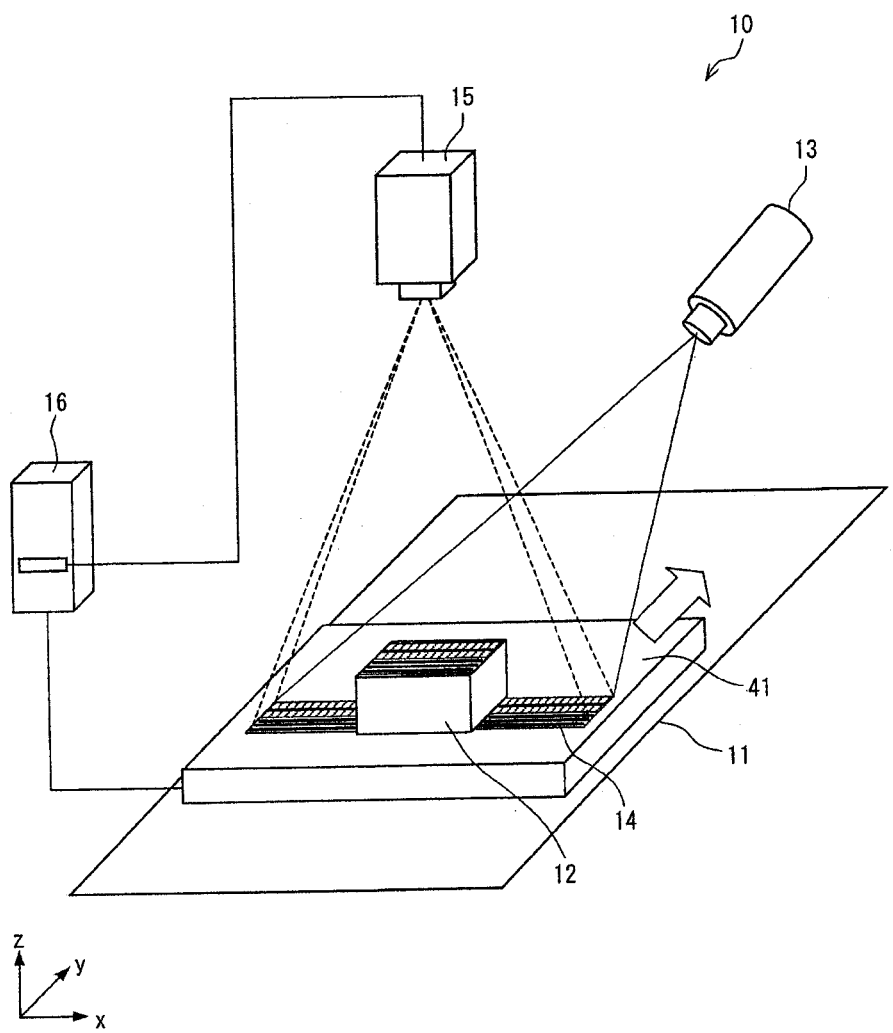
FIG. 2 is a view illustrating a schematic configuration of the three-dimensional shape measuring system and a state in which a measurement target is measured according to one or more embodiments of the present invention.

In embodiments of the invention, numerous specific details are set forth in order to provide a more thorough understanding of the invention. However, it will be apparent to one with ordinary skill in the art that the invention may be practiced without these specific details. In other instances, well-known features have not been described in detail to avoid obscuring the invention. One or more embodiments of the present invention will be described with reference to FIGS. 1 to 11. FIG. 2 is a view illustrating a schematic configuration of a three-dimensional shape measuring system (three-dimensional shape measuring apparatus) 10 according to one or more embodiments of the present invention.

As illustrated in FIG. 2, in the three-dimensional shape measuring system 10 of one of more embodiments of the present invention, an optical pattern 14 is projected from a phototransmitting unit 13 to a measurement target 12 placed on a conveying table 41 of a conveying unit 11, an imaging unit (imaging device) 15 captures the optical pattern 14 projected to the measurement target 12, a control unit 16 analyzes a shape of the captured optical pattern 14, and the above operation is repeatedly performed while the measurement target 12 is moved by the conveying unit 11, thereby measuring the whole three-dimensional shape of the measurement target 12. Examples of the measured three-dimensional shape include a depth of a recess and a height of a protrusion, which are provided in a surface of the measurement target 12, and positions thereof. There is no particular limitation to usage of the three-dimensional shape measuring system 10. For example, the three-dimensional shape measuring system 10 can be applied to an apparatus that inspects a mounting board.

Hereinafter, it is assumed that a y-axis direction is a conveyance direction (direction indicated by an arrow of FIG. 2) of the conveying table 41 while a z-axis direction is a direction perpendicular to the conveying table 41, namely, a height direction.

Figure 4:
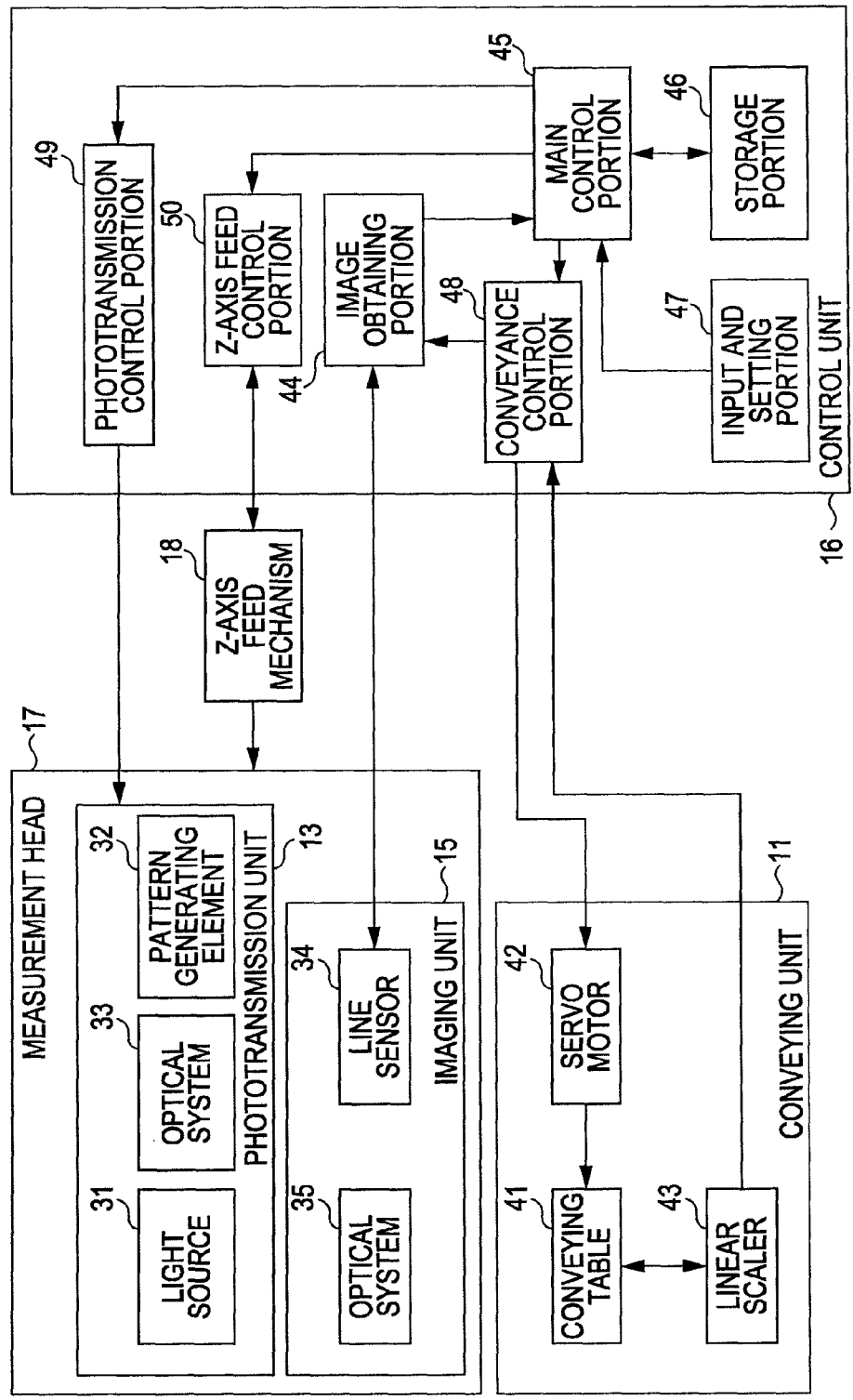
FIG. 4 is a block diagram illustrating a configuration of a main part of a three-dimensional shape measuring system according to one or more embodiments of the present invention.

FIG. 4 is a block diagram illustrating a configuration of a main part of the three-dimensional shape measuring system 10. As illustrated in FIG. 2, the three-dimensional shape measuring system 10 includes the conveying unit 11, the phototransmitting unit 13, the imaging unit 15, and the control unit 16.

As described above, the phototransmitting unit 13 projects the optical pattern 14 to the surface of the measurement target 12. As illustrated in FIG. 4, the phototransmitting unit 13 includes a light source 31 such as a halogen lamp and a xenon lamp, a pattern generating element 32 that partially converts light emitted from the light source 31 into light having a pattern, and an optical system 33 such as a macro lens.

Any pattern, such as a sine wave, a triangular wave, and a rectangular wave, which has a periodicity according to a position and can specify a phase, can be used as the projected optical pattern 14. However, the sine-wave optical pattern 14 contributing to improvement of measurement resolution is used in one or more embodiments of the present invention. For example, the pattern generating element 32 may include a liquid crystal element or may be formed by processing glass or film.

As described above, the imaging unit 15 reads the measurement target 12 to which the optical pattern 14 is projected, and obtains an image of the measurement target 12. As illustrated in FIG. 4, the imaging unit 15 also includes a line sensor 34 and an optical system 35 such as a macro lens. Four line sensors 34 are used in one or more embodiments of the present invention.

The conveying unit 11 horizontally moves the measurement target 12 in a main scanning direction (longitudinal direction) of the line sensor 34 and a direction perpendicular to the main scanning direction (hereinafter referred to as a "sub-scanning direction"). As illustrated in FIG. 4, the conveying unit 11 includes the conveying table 41 on which the measurement target 12 is placed and a servo motor 42 that drives the conveying table 41. The conveying unit 11 may include a linear scaler 43 that detects a position of the conveying table 41.

The line sensor 34 sequentially captures the image of the measurement target 12 while the conveying unit 11 moves the measurement target 12 in a sub-scanning direction, which allows the three-dimensional shape of the whole measurement target 12 to be measured. In the case where the measurement target 12 is wider than an imaging range of the line sensor 34 in a main scanning direction, the line sensor 34 may sequentially capture the image of the measurement target 12 while the conveying unit 11 moves the measurement target 12 in the main scanning direction.

The control unit 16 collectively controls various units in the three-dimensional shape measuring system 10. Specifically, the control unit 16 controls the conveying unit 11, the phototransmitting unit 13, and the imaging unit 15, analyzes the optical pattern 14 included in the image captured by the imaging unit 15 by a fringe analysis method, and computes the three-dimensional shape of the measurement target 12.

Further, in one or more embodiments of the present invention, the phototransmitting unit 13 and the imaging unit 15 are integrally provided as a measurement head 17, and a z-axis feed mechanism (displacement portion) 18 is provided in order to move the measurement head 17 in the z-axis direction (height direction). The control unit 16 issues an instruction to the z-axis feed mechanism 18 to control a height of the measurement head 17.

As to a configuration of the measurement head 17, it is conceivable that the phototransmitting unit 13 and the imaging unit 15 are provided in a certain base (not illustrated) and the base is moved in a height direction by the z-axis feed mechanism 18. In this case, the base desirably has rigidity such that a geometrical positional relationship between the phototransmitting unit 13 and the imaging unit 15 is retained even if the base moves in the height direction. A well-known mechanism such as a screw feed mechanism which moves an object can be used as the z-axis feed mechanism 18.

In one or more embodiments of the present invention, the control unit 16 corrects the height computed by the fringe analysis method and computes the height of the measurement target 12 based on a feed amount (displacement amount) $\Delta z$ that is an amount in which the z-axis feed mechanism 18 moves (displaces) the measurement head 17 from a certain reference position in the height direction. Based on the computed height of the measurement target 12, the control unit 16 controls the z-axis feed mechanism 18 so as to move the measurement head 17 in the height direction.

Accordingly, the measurement range can easily be displaced in the height direction by changing the height adjusting mechanism, which is conventionally provided in order to calibrate the three-dimensional shape measuring apparatus, to the z-axis feed mechanism 18. Because the calibration of the z-axis feed mechanism 18 can be performed along with the conventional calibration, an increase of labor cost of the calibration can be suppressed.

The height computed by the fringe analysis method is corrected based on the feed amount $\Delta z$ by the z-axis feed mechanism 18, which allows the height of the measurement target to be correctly computed without providing a new height measuring sensor. As a result, the measurable height can simply be expanded while the measurement range is maintained. The details of the control unit 16 will be described below.

Next, the details of the control unit 16 will be described. As illustrated in FIG. 4, the control unit 16 includes an image obtaining portion 44, a main control portion 45, a storage portion 46, an input and setting portion 47, a conveyance control portion 48, a phototransmission control portion 49, and a z-axis feed control portion (displacement portion control means) 50.

The main control portion 45 provides various instructions to the conveyance control portion 48, the phototransmission control portion 49, and the z-axis feed control portion 50. The main control portion 45 is implemented by causing a CPU (Central Processing Unit) to execute various control programs. Alternatively, the main control portion 45 may be implemented by a DSP (Digital Signal Processor) and an FPGA (Field Programmable Gate Array), which are not illustrated. The details of the main control portion 45 will be described later.

Various pieces of information are stored in the storage portion 46. The storage portion 46 is constructed by one of a RAM (Random Access Memory), a ROM (Read Only Memory), and an external storage device, or a combination thereof. The details of the pieces of information stored in the storage portion 46 will be described later.

The image obtaining portion 44 obtains image information from the imaging unit 15, and is configured by a capture board and the like. The image obtaining portion 44 converts the obtained image information into image data that can be processed by the main control portion 45, and transmits the image data to the main control portion 45.

The input and setting portion 47 receives various inputs such as an instruction input, an information input, and a setting input from a user. For example, the input and setting portion 47 includes a key input device such as a keyboard and a button and a pointing device such as a mouse. Along with the input and setting portion 47 or in place of the input and setting portion 47, the various inputs may be received from the outside using a scanner device that reads the printed information, a receiving device that receives a signal through a wireless or wired transmission medium, a reproducing device that reproduces data recorded in a recording medium of the external device or inside thereof, and the like.

The conveyance control portion 48, the phototransmission control portion 49, and the z-axis feed control portion 50 control the conveying unit 11, the phototransmitting unit 13, and the z-axis feed mechanism 18 based on the instruction from the main control portion 45.

An example of a geometrical positional relationship of each portion included in the three-dimensional shape measuring system 10 will be described below. However, one or more embodiments of the present invention is not limited thereto.

In the three-dimensional shape measuring system 10 of one or more embodiments of the present invention, the line sensor 34 of the imaging unit 15 is disposed such that the main scanning direction of the line sensor 34 is parallel with a surface (reference plane) on which the conveying table (mounting stage) 41 is placed. When the main scanning direction of the line sensor 34 is line sensor 34 is parallel with the surface on which the conveying table 41 is placed, an upper surface of the measurement target 12 can be imaged with an even magnification. Because the main scanning direction of the line sensor 34 is perpendicular to the sub-scanning direction, a right-angle part is imaged as the right-angle part in a two-dimensional image including a plurality of line images that are captured while being conveyed.

The phototransmitting unit 13 is provided such that an optical axis of the phototransmitting unit 13 has a predetermined angle with respect to an optical axis of the imaging unit 15. Therefore, although described later in detail, the height of the measurement target 12 can be computed based on a deviation of the optical pattern 14 projected to the measurement target 12. Geometrical dispositions of the imaging unit 15 and the phototransmitting unit 13 may previously be measured when the imaging unit 15 and the phototransmitting unit 13 are placed, or the geometrical dispositions may be computed by the calibration.

An operation of the three-dimensional shape measuring system 10 will be described below. First, various devices are calibrated. For example, a calibrating target (not illustrated) is placed on the conveying table 41, the imaging unit 15 captures an image of the placed calibrating target, the control unit 16 analyzes the captured image of the calibrating target to compute an inclination φ of the optical axis of the imaging unit 15, thereby calibrating the optical axis of the imaging unit 15.

After various calibrations, the three-dimensional shape of the measurement target 12 is measured. The servo motor 42 of the conveying unit 11 sets the conveying table 41 to an initial setting position in response to a command from the conveyance control portion 48 of the control unit 16. The initial setting position fixes an imaging start position in the sub-scanning direction when the imaging unit 15 captures the image of the measurement target 12, and the initial setting position may be a position in which an imaging area of the imaging unit 15 is located in an end part in the sub-scanning direction of the measurement target 12 placed on the conveying table 41 of the conveying unit 11.

The phototransmitting unit 13 projects the optical pattern 14 to the measurement target 12. The imaging unit 15 scans the measurement target 12 to which the optical pattern 14 is projected, and captures the image of the measurement target 12. The image captured by the imaging unit 15 is transmitted to the control unit 16 and converted into digital data by the image obtaining portion 44 of the control unit 16. The main control portion 45 of the control unit 16 analyzes the optical pattern 14 to compute the height information on the measurement target 12.

In a configuration of the three-dimensional shape measuring system 10 of one or more embodiments of the present invention, a spatial fringe analysis method is used in analyzing the optical pattern 14 in the image. Therefore, the height in each position in the area of the measurement target 12 and the scanning area (imaging area) of the imaging unit 15 can be obtained from four line images obtained by one-time scan of the four line sensors 34 included in the imaging unit 15. The details of the spatial fringe analysis method will be described later.

The conveying unit 11 moves the measurement target 12 in the sub-scanning direction by a predetermined distance under the control of the control unit 16. Therefore, the imaging area of the imaging unit 15 in the measurement target 12 and the optical pattern 14 projected by the phototransmitting unit 13 are deviated from each other by the predetermined distance in the sub-scanning direction. Then, the imaging unit 15 scans the measurement target 12 again to capture the line image. The line image captured at this time includes the area of the measurement target 12, which is deviated from the previously scanned area by the predetermined distance in the sub-scanning direction. Similarly, the captured image is transmitted to the control unit 16 to obtain the three-dimensional information in each position in the newly-scanned area.

Thus, the whole three-dimensional shape of the measurement target 12 is measured by repeatedly performing the processing, in which the conveying unit 11 moves the measurement target 12 by the predetermined distance again, the imaging unit 15 captures the image of the measurement target 12, and the control unit 16 analyzes the line image.

In the three-dimensional shape information on the measurement target 12, the information on the length in the main scanning direction of the line sensor 34 and the information on the length in the sub-scanning direction can be measured by a well-known method. For example, the information on the length in the main scanning direction of the measurement target 12 can be computed based on the length in the main scanning direction of the measurement target captured as the line image. The information on the length in the sub-scanning direction of the measurement target 12 can be computed based on a moving speed of the conveying unit 11. The three-dimensional shape information on the measurement target 12 can be obtained by fixing the pieces of information on the lengths in the main scanning direction and the sub-scanning direction and the height information of the measurement target 12.

The predetermined distance mentioned above may be equal to the length in the sub-scanning direction of the imaging area of the imaging unit 15. Therefore, the whole area of the measurement target 12 can promptly be measured by the above process.

The image capturing at each predetermined distance can be achieved such that the imaging unit 15 captures the image at constant time intervals while the conveying table 41 is moved at a constant speed. In this case, for example, the conveyance control portion 48 transmits an imaging drive signal to the imaging unit 15 through the image obtaining portion 44 at constant time intervals on the order of several kilohertz. The imaging unit 15 captures the image of the measurement target 12 to which the optical pattern 14 is projected as a trigger of this drive signal. On the other hand, the conveyance control portion 48 also transmits a conveyance drive signal to the conveying unit 11 at constant time intervals. The servo motor 42 of the conveying unit 11 drives the conveying table 41 at a constant speed with this conveyance drive signal as a trigger. Therefore, the measurement target 12 can be captured in each predetermined area.

The linear scaler 43 may be used in the image capturing in each predetermined distance. In this case, as illustrated in FIG. 4, the linear scaler 43 is provided in the conveying unit 11, and the linear scaler 43 transmits the signal to the conveyance control portion 48 each time the conveying table 41 is moved by the predetermined distance. When receiving the signal, the conveyance control portion 48 transmits the imaging drive signal to the line sensor 34 of the imaging unit 15. Irrespective of unevenness of the conveyance speed of the conveying unit 11, the image capturing can accurately be performed in each predetermined distance, and therefore accuracy of the three-dimensional measurement is improved.

Next, advantages of such a three-dimensional shape measuring system 10 will be described. In one or more embodiments of the present invention, the line sensor 34 is used as the read sensor included in the imaging unit 15. For example, in the case where the line sensor 34 having 10000 pixels in the main scanning direction is used, the measurement target having the length of 100 mm in the main scanning direction can be captured with resolution of about 10 μm. On the other hand, for example, in the case where an area camera having 640 pixels in the width direction is used, the image of the measurement target having the length of 100 mm in the width direction can be captured only with resolution of about 150 μm.

In order that the area camera captures the image with the same resolution as the line sensor 34, it is necessary to perform at least 12 sets of processing process in which the area camera captures the image while being moved by the predetermined distance in the main scanning direction. In this case, it takes a long time to move the imaging unit 15 in the main scanning direction to capture the image.

On the other hand, in the three-dimensional shape measuring system 10 of one or more embodiments of the present invention, the use of the line sensor 34 can capture the image of the measurement target 12 at high speed with high resolution.

Further, in one or more embodiments of the present invention, each line image captured by the imaging unit 15 is analyzed by the spatial fringe analysis method. In the spatial fringe analysis method, a phase deviation of the optical pattern 14 is computed from one line image, and the three-dimensional information can be computed from this phase deviation. Therefore, because only one-time scan is required for the measurement target 12, the measurement can be performed at high speed compared with the configuration in which the plural-time scan is required.

Because the height can be measured based only on the line image obtained by one-time scan, the three-dimensional shape can be measured at the same time as the scan is performed. Therefore, for example, in the case of the inspection of the board, when some sort of production defect is found on the board that becomes the measurement target 12, the measurement can immediately be interrupted without repeating the imaging processing to the end, and the prompt inspection of the board can be achieved.

The details of the image analysis performed by the main control portion 45 of the control unit 16 will be described below. A principle of the image analyzing technique of one or more embodiments of the present invention will be described with reference to FIGS. 5 to 8.

Figure 15:
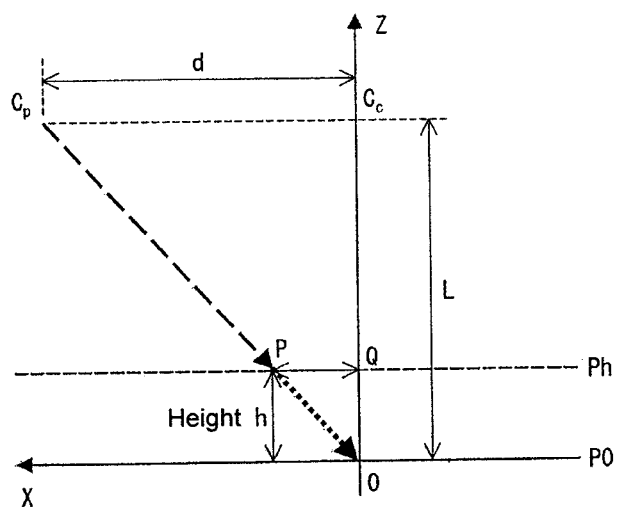
FIG. 15 is a view illustrating a principle of triangulation.

The main control portion 45 analyzes the line image of the measurement target 12, to which the optical pattern 14 is projected, based on the spatial fringe analysis method. As described above, the spatial fringe analysis method is based on the principle of the triangulation. Because the principle of the triangulation is already described with reference to FIG. 15, the fringe analysis method and the spatial fringe analysis method will sequentially be described below.

Figure 5:
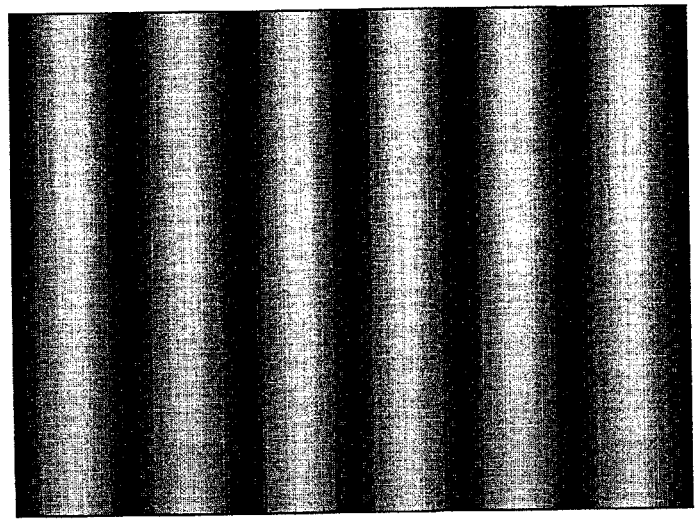
FIG. 5 is a view illustrating an example of an optical pattern projected by a phototransmitting unit of the three-dimensional shape measuring system according to one or more embodiments of the present invention.

First, the fringe analysis method will be described. As described above, in one or more embodiments of the present invention, the sine-wave optical pattern is used as the optical pattern 14 projected to the measurement target 12. The sine-wave optical pattern means a pattern having gradation in which luminance is expressed by a sine function. In other words, the optical pattern in which a relationship between the position and the luminance is expressed by the sine function is called a sine-wave optical pattern. FIG. 5 illustrates an example of the sine-wave optical pattern.

Figure 6A:
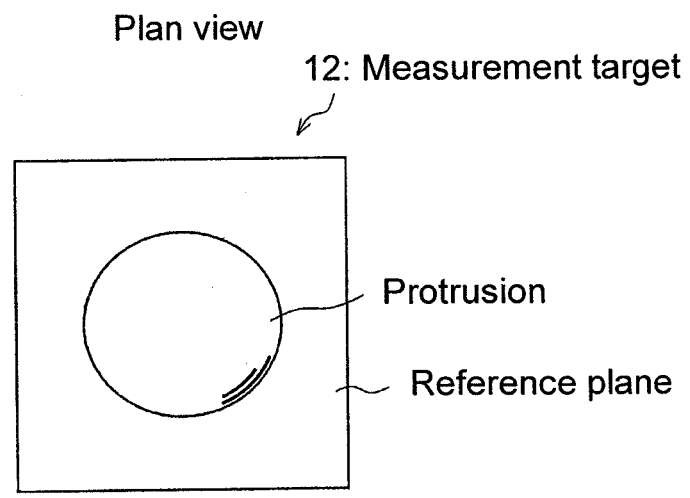
FIG. 6A is a plan view illustrating a shape of a measurement target according to one or more embodiments of the present invention.
Figure 6B:
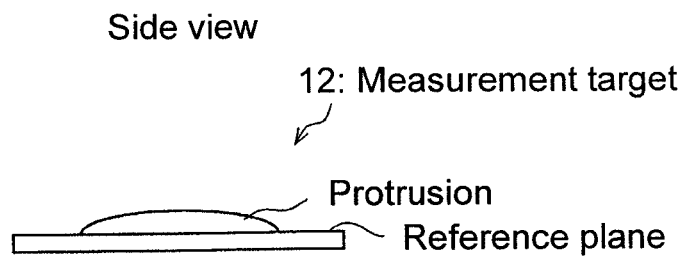
FIG. 6B is a side view illustrating a shape of a measurement target according to one or more embodiments of the present invention.
Figure 7A:
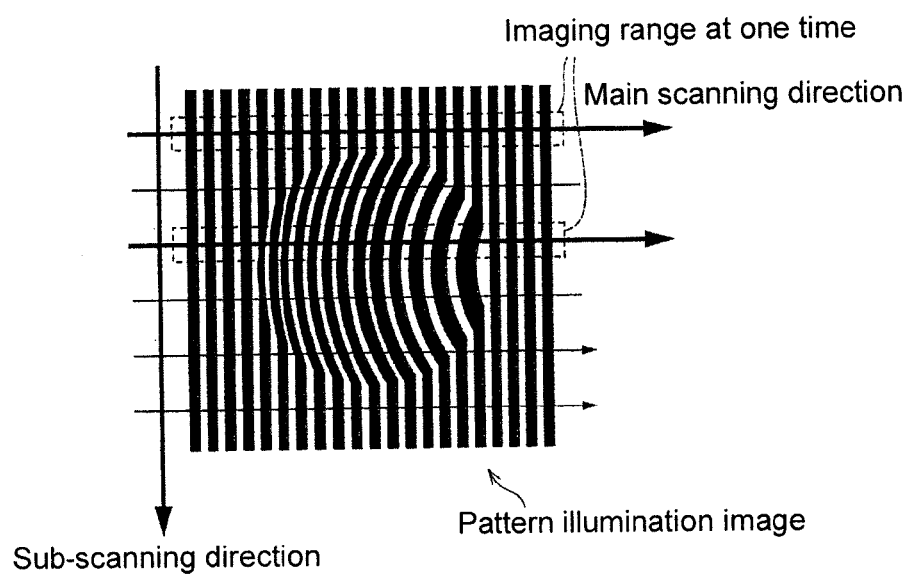
FIG. 7A is a plan view illustrating a strain of the optical pattern projected to the measurement target when the optical pattern is projected to the measurement target according to one or more embodiments of the present invention.

In the case where such an optical pattern is projected to the measurement target 12 illustrated in FIGS. 6A and 6B, FIG. 7A is obtained when the projected optical pattern is observed from above. That is, in the obliquely-projected optical pattern, a strain is generated in a protrusion having a height. When the measurement target 12 to which the optical pattern is projected is scanned by the line sensor 34 of the imaging unit 15, the relationship between the scanning position and the luminance becomes FIG. 7B.

Figure 7B:
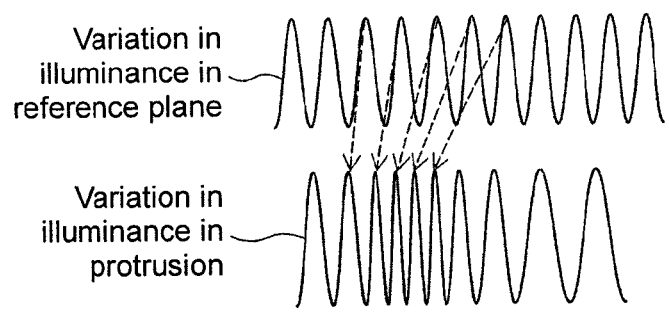
FIG. 7B is a waveform diagram illustrating a variation in luminance in a reference plane and a variation in luminance in a protrusion according to one or more embodiments of the present invention.

As illustrated by an upper stage of FIG. 7B, the luminance always changes at a constant period in the optical pattern projected to the reference plane having no protrusion. On the other hand, as illustrated by a lower stage of FIG. 7B, the period of the luminance changes by the inclination of the protrusion in the optical pattern projected to the protrusion, and therefore the phase deviation is generated with respect to the optical pattern projected to the reference plane. Accordingly, when a difference between the phase of the optical pattern in a pixel at a certain position included in the image (line image) that is captured while the optical pattern is actually projected to the measurement target 12 and the phase (reference phase) in the same pixel that is captured while the optical pattern is projected to the reference plane is obtained, the height of the measurement target 12 at the position corresponding to the pixel can be obtained based on the principle of the triangulation.

In computing the above phase difference, the reference phase can previously be obtained by projecting the optical pattern to the reference plane to capture the image. On the other hand, there are roughly two ways to obtain the phase of the optical pattern in the pixel at each position included in the image (line image) that is captured while the optical pattern is actually projected to the measurement target 12. The spatial fringe analysis method differs from a temporal fringe analysis method in the way to obtain this phase.

As illustrated in FIG. 7B, in the sine function, two phases each of which provides a certain displacement exist in one period. For example, in a function expressed by $y=\sin \theta$, a solution of a phase $\theta$ that provides a displacement $y=0$ is $0$ and $\pi$. A solution of the phase $\theta$ that provides a displacement $y=\frac{1}{2}$ is $\pi/6$ and $5\pi/6$. For this reason, in the captured image, the phase of the optical pattern in the pixel cannot be obtained only from the luminance value (corresponding to the displacement of the sine function) of the single pixel.

In the temporal fringe analysis method (phase shift method) that is the conventional technique, at least three optical patterns are projected to the measurement target 12 to capture the images of the measurement target 12 while the phases are shifted by a predetermined amount, and the one phase is fixed by analyzing the obtained images. Accordingly, in the case of using the temporal fringe analysis method, it is necessary to image the measurement target 12 at least three times even if the measurement target 12 strictly has a uniform reflection characteristic.

On the other hand, in the spatial fringe analysis method, based on the pixel (hereinafter referred to as a "focused pixel") in which the phase is obtained and the luminance of each of the pixels surrounding the focused pixel, the phase in the focused pixel is computed. For example, in the above example, the phase $\theta$ that provides the displacement $y=0$ is $0$ and $\pi$, and the phase of $0$ differs from the phase of $\pi$ in the luminance of each of the pixels surrounding the focused pixel. In the case of the phase of $0$ in the focused pixel, for example, the luminance value of the surrounding pixel existing on the side on which the phase is slightly smaller than that of the focused pixel is smaller than the luminance value of the focused pixel. On the other hand, in the case of the phase of $\pi$ in the focused pixel, the luminance value of the surrounding pixel existing on the side on which the phase is slightly smaller than that of the focused pixel is larger than the luminance value of the focused pixel. Accordingly, the one phase of the optical pattern can be fixed based on the pixels near the focused pixel. One of the features of the spatial fringe analysis method is that the phase in the focused pixel is fixed based on the luminance value of the pixel existing near the focused pixel.

A specific processing process of the spatial fringe analysis method used in the three-dimensional shape measuring system 10 of one or more embodiments of the present invention will be described in detail below. However, one or more embodiments of the present invention is not limited thereto, and any processing process based on the principle of the fringe analysis method described above may be used.

In one or more embodiments of the present invention, a phase-shift optical pattern in which the phase of the optical pattern is shifted by 90° from the captured line image is virtually produced. At this point, it is assumed that the projected optical pattern is the following equation (2).

[Formula 2]

$$I(x) = B(x)\sin(\phi(x)) \quad (2)$$

(Where I(x) expresses a luminance value in a position x, B(x) expresses an arbitrary function, and $\phi(x)$ expresses a phase in the position x.) The phase-shift optical pattern in which the phase of the optical pattern is shifted by 90° is expressed by the following equation (3).

[Formula 3]

$$\hat{I}(x) = B(x)\sin\left(\phi(x) + \frac{\pi}{2}\right) \quad (3)$$
$$= B(x)\cos(\phi(x))$$

(Where $\hat{I}(x)$ expresses a luminance value in the position x by the phase-shift optical pattern.) Accordingly, the phase $\phi(x)$ of the pixel in the position x can be fixed by the following equation (4).

[Formula 4]

$$\phi(x) = \tan^{-1}\frac{I(x)}{\hat{I}(x)} \quad (4)$$

At this point, a value of I(x) is the luminance value of the pixel in the position x in the main scanning direction. On the other hand, a value of I^(x) (hereinafter I(x) with a hat is described by I^(x) for the sake of convenience) is computed using a Hilbert transform. That is, the luminance value I^(x) in the position x by the phase-shift optical pattern is expressed by the following equation (5).

[Formula 5]

$$\hat{I}(x) = \frac{1}{\pi}\int_{-\infty}^{\infty}\frac{I(\tau)}{x-\tau}d\tau \quad (5)$$

At this point, because the luminance data that can be obtained is data in each pixel, namely, discrete data, the equation (5) is approximated by the following equation (6).

[Formula 6]

$$\hat{I}(x) = \sum_{k=-N}^{N} h(x-k)I(k) \quad (6)$$

(Where h(x) is a function, expressed by $$h(x) = \frac{1}{\pi x},$$

which indicates a temporal area characteristic of the Hilbert transform). The value of I^(x) can be obtained by the equation (6).

Therefore, when the luminance value I(x) is obtained, the value of I^(x) is obtained from the equation (6), and the phase $\phi(x)$ can be obtained from the equation (4). Based on the principle of the triangulation described above, a height z in the position x can be obtained from a phase difference $\Delta\phi(x)$ between the obtained phase $\phi(x)$ and the phase $\phi_0(x)$ in the reference plane.

Specifically, the height z is computed as a distance from the reference plane, and the height z can be obtained by the following equation (7).

[Formula 7]

$$z = f(\Delta\phi(x)) = \frac{\Delta\phi(x)}{A(x, z)\Delta\phi(x) + B(x, z)} \quad (7)$$

In the equation (7), A(x, z) and B(x, z) are functions each of which is fixed in each pixel according to the geometrical disposition such as the pattern period, the distance from the camera to the reference plane, and the projection angle of the pattern. However, because the functions are a function of an unknown number z, it is difficult to compute a strict form. Accordingly, in one or more embodiments of the present invention, the calibration target having the well-known height is previously observed, the values of A(x, z) and B(x, z) are computed in each pixel x, and the function form of z is estimated by a straight-line approximation or a spline function approximation using the values of A(x, z) and B(x, z).

In one or more embodiments of the present invention, because the measurement head 17 is displaced in the height direction, the reference plane is also displaced. Accordingly, the height of the measurement target 12 is obtained by adding a feed amount $\Delta z$ to the height z computed from the equation (7).

A configuration of the main control portion 45 will be described below. FIG. 1 illustrates a configuration of main part of the control unit 16, particularly the configuration of main part of the main control portion 45. The main control portion 45 includes a background removing portion 72, a Hilbert transform portion 74, a phase computing portion (phase computing means) 75, a phase difference computing portion 76, a height computing portion (height computing means) 77, and a feed amount computing portion (displacement portion control means) 78. An inverse tangent DB (Database) 62, a reference phase DB 63, a function DB 61, a three-dimensional shape DB 64, and a feed amount DB 65 exist in the storage portion 46 of the control unit 16.

The inverse tangent DB 62 is a database that indicates a correlation between y and x in a function expressed by $y = \tan^{-1} x$, and the value of x and the value of $\tan^{-1} x$ are previously stored while correlated. Therefore, the value of y of inverse tangent of the value of x can be searched based on the value of x.

The reference phase DB 63 is a database that previously stores the phase (hereinafter referred to as "reference phase") of the optical pattern in each pixel of the line image that is obtained by capturing the image of the reference plane (plane always having height of 0) to which the optical pattern is projected. The position x in the main scanning direction of the pixel included in the line image and the reference phase $\phi_0(x)$ in the pixel are stored in the reference phase DB 63 while correlated. Therefore, the reference phase $\phi_0(x)$ in the pixel can be searched based on the information on the position x of the pixel included in the line image. In the calibration mode, desirably the reference phase DB 63 is previously stored in the storage portion 46 or updated.

The function DB 61 is a database that previously stores the function A(x, z) and the function B(x, z), which are included in the equation (7). The position x in the main scanning direction of the pixel included in the line image and the function A(x, z) and the function B(x, z) in the pixel, which are estimated by observing the calibrating target, are stored in the function DB 61 while correlated. Therefore, the function A(x, z) and the function B(x, z) in the pixel can be searched based on the information on the position x of the pixel included in the line image.

The three-dimensional shape DB 64 is a database that stores the three-dimensional shape information on the measurement target 12, which is obtained by the measurement. An x-coordinate (corresponds to main scanning direction), a y-coordinate (corresponds to sub-scanning direction), and a z-coordinate (corresponds to height), which specify a point on the surface of the measurement target 12, are stored in the three-dimensional shape DB 64 while correlated. Therefore, after the measurement, the height (z-coordinate) in the position can be searched based on the x-coordinate and the y-coordinate of the measurement target 12.

The feed amount DB 65 is a database that stores the feed amount Δz that is an amount in which the z-axis feed mechanism 18 moves the measurement head 17 in the height direction from a certain reference position. The feed amount Δz and the y-coordinate may be stored in the feed amount DB 65 while correlated.

The background removing portion 72 obtains the line image from the image obtaining portion 44 and removes a background component from the obtained line image. The background removing portion 72 transmits the line image in which the background component is removed to the Hilbert transform portion 74 and the phase computing portion 75. Specifically, the background removing portion 72 obtains the line image in which the image of the measurement target 12 is captured while the optical pattern is projected to the measurement target 12 and the control line image in which the image of the measurement target 12 is captured while the measurement target 12 is illuminated with the light having the even luminance without projecting the optical pattern, and the background removing portion 72 divides the luminance value of each pixel in the line image to which the optical pattern is projected by the luminance value of the corresponding pixel of the control line image.

Figure 8A:
FIG. 8A is a view illustrating an example of a line image in a state in which the optical pattern is projected according to one or more embodiments of the present invention.
Figure 8B:
FIG. 8B is a view illustrating an example of a control line image according to one or more embodiments of the present invention.

FIG. 8A illustrates an example of the line image to which the optical pattern is projected, and FIG. 8B illustrates an example of the control line image. As can be seen from FIG. 8B, unevenness (splash) is generated in the captured image even if the measurement target 12 is illuminated with the light having the even luminance. This is attributed to the fact that regions of the measurement target 12 differs from one another in the reflection characteristic. As illustrated in FIG. 8A, the unevenness is also generated in the line image to which the optical pattern is projected, thereby generating an error in the phase that is computed using the line image.

A luminance value $g_1(x)$ of the line image to which the optical pattern is projected is expressed by the following equation (8).

[Formula 8]

$$g_1(x) = A(x)I_0\{1 + B\sin[kx + \Phi(x)]\} \quad (8)$$

Where A(x) is a reflectance of the measurement target 12, $I_0$ is average intensity of the light with which the measurement target 12 is illuminated, B is an amplitude of the optical pattern, k is a frequency of the optical pattern, and (I) is a phase modulation by the height of the measurement target 12.

On the other hand, a luminance value $g_2(x)$ of the control line image is expressed by the following equation (9).

[Formula 9]

$$g_2(x) = A(x)I_0 \quad (9)$$

When the equation (8) is divided by the equation (9), the following equation (10) is obtained.

[Formula 10]

$$\frac{g_1(x)}{g_2(x)} = 1 + B\sin[kx + \Phi(x)] \quad (10)$$

A reflectance A(x) that depends on each region of the measurement target 12 is removed in the equation (10).

In the imaging unit 15 of one or more embodiments of the present invention, a first line sensor that obtains the line image and a second line sensor that obtains the control line image are provided as the line sensor 34.

Figure 3A:
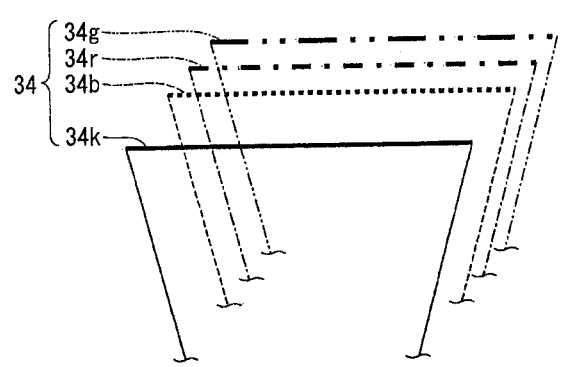
FIG. 3A is an enlarged view illustrating a main part of the three-dimensional shape measuring system according to one or more embodiments of the present invention.

FIG. 3 illustrates the configuration of the main part of the three-dimensional shape measuring system 10. FIG. 3A illustrates the details of the line sensor 34 provided in the imaging unit 15. As illustrated in FIG. 3, four line sensors including a line sensor 34k that captures a monochrome component (luminance component) and line sensors 34b, 34r, and 34g that captures a blue component, a red component, and a green component is used in one or more embodiments of the present invention. Hereinafter, the line sensors 34k, 34b, 34r, and 34g are collectively referred to as "line sensors 34".

Figure 3B:
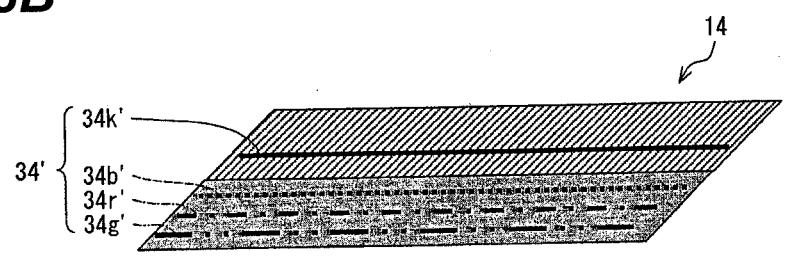
FIG. 3B is an enlarged view illustrating a main part of the three-dimensional shape measuring system according to one or more embodiments of the present invention.

FIG. 3B illustrates the measurement target 12 illuminated with the optical pattern 14 and imaging areas 34k', 34b', 34r', and 34g' that are the areas captured by the line sensors 34k, 34b, 34r, and 34g. As illustrated in FIG. 3B, the imaging area 34k' where the monochrome component is captured is included in the area illuminated with the optical pattern 14, and the imaging areas 34b', 34r', and 34g' where the blue component, the red component, and the green component are captured are included in the areas that are not illuminated with the optical pattern 14. That is, the line sensor 34k corresponds to the first line sensor and the line sensors 34b, 34r, and 34g correspond to the second line sensor.

Accordingly, in one or more embodiments of the present invention, only by scanning the measurement target 12 one time, the line image can be obtained from the captured image of the line sensor 34k while a color image of the measurement target 12 can be obtained from the captured images of the line sensors 34b, 34r, and 34g. The control line image can be obtained by converting the color image into a luminance image. The image of only the optical pattern 14 can be obtained from the obtained line image and the obtained control line image using the equations (8) to (10). Accordingly, because the height of the measurement target 12 can be computed only by performing the one-time scan to the measurement target 12, the three-dimensional shape of the measurement target 12 can promptly be measured.

The Hilbert transform portion 74 performs the Hilbert transform to the line image data from the background removing portion 72, namely, the line image data in which the background component is removed based on the equation (6) to which the equation (10) is applied. The Hilbert transform portion 74 transmits the line image data to which the Hilbert transform is performed to the phase computing portion 75.

The phase computing portion 75 computes the phase of the optical pattern in the position x using the line image data in which the background component is removed by the background removing portion 72 and the line image data to which the Hilbert transform is performed by the Hilbert transform portion 74. Specifically, the phase computing portion 75 computes the phase $\phi(x)$ (=$kx+\phi(x)$) of the optical pattern in the position x based on the equation (4) to which the equation (10) is applied. The phase computing portion 75 transmits the computed phase $\phi(x)$ to the phase difference computing portion 76. In one or more embodiments of the present invention, the phase computing portion 75 obtains the value of the inverse tangent in the equation (4) by referring to the inverse tangent DB 62. Alternatively, the value of the inverse tangent in the equation (4) may be obtained by numerical computation.

The phase difference computing portion 76 computes a phase difference (deviation of phase) $\Delta\phi(x)$ in the position x. The phase difference computing portion 76 transmits the computed phase difference $\Delta\phi(x)$ to the height computing portion 77. Specifically, the phase difference computing portion 76 refers to the reference phase DB 63 to obtain the reference phase $\phi_0(x)$ (=$kx$) of the optical pattern in the position x while receiving the phase $\phi(x)$ of the optical pattern in the position x from the phase computing portion 75. The phase difference computing portion 76 subtracts the reference phase $\phi_0(x)$ from the phase $\phi(x)$ to compute the phase difference $\Delta\phi(x)$ (=$\phi(x)$) in the position x.

The height computing portion 77 computes the height z of the measurement target 12 in the position x. The height computing portion 77 stores the computed height z in the three-dimensional shape DB 64 while the height z is correlated with the coordinate x in the main scanning direction and the coordinate y in the sub-scanning direction, and transmits the height z to the feed amount computing portion 78.

Specifically, the height computing portion 77 refers to the function DB 61 to obtain the function A(x, z) and the function B(x, z) in the position x while receiving the phase difference $\Delta\phi(x)$ in the position x from the phase difference computing portion 76. Then, the height computing portion 77 computes the height z from the phase difference $\Delta\phi(x)$, the function A(x, z), and the function B(x, z) based on the equation (7). The height computing portion 77 corrects the computed height z by adding the feed amount $\Delta z$ from the feed amount DB 65 to the computed height z. The corrected height z becomes the height z of the measurement target 12 in the position x.

The feed amount computing portion 78 computes an average value of the heights z of the measurement target 12 from the height computing portion 77 with respect to some of or all the positions x, computes the feed amount $\Delta z$ such that the computed average value becomes the center of the measurement range in the next scan, and stores the computed feed amount $\Delta z$ in the feed amount DB 65 while transmitting the feed amount $\Delta z$ to the z-axis feed control portion 50. Therefore, the z-axis feed control portion 50 controls the z-axis feed mechanism 18 to displace the measurement head 17 such that the displacement amount of the measurement head 17 becomes the feed amount $\Delta z$ from the feed amount computing portion 78. Statistical values such as a mode value and a median value may be used in addition to the average value.

Figure 9:
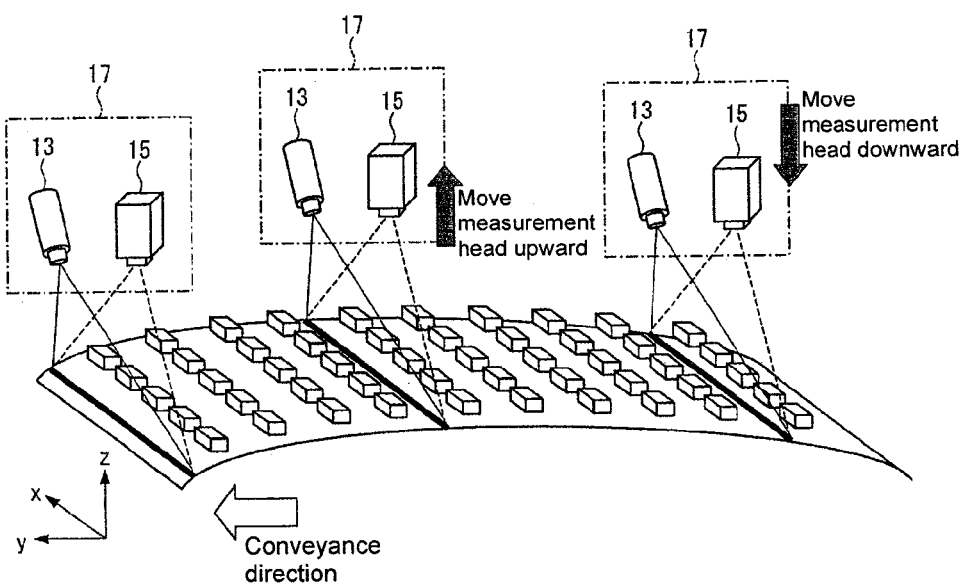
FIG. 9 is a schematic diagram illustrating motion of a measurement head of the three-dimensional shape measuring system with a board as an example of a measurement target according to one or more embodiments of the present invention.

FIG. 9 illustrates an example of motion of the measurement head 17 in the three-dimensional shape measuring system 10 having the above configuration. In the example of FIG. 9, a board 12a that is the measurement target 12 is warped while being convex upward, and the board 12a is conveyed in a y-axis direction. In this case, the measurement head 17 starts the scanning from the left of FIG. 9, the measurement head 17 moves downward after moving upward according to the warpage of the board 12a.

As described above, in the case where the measurement head 17 is displaced according to the warpage of the board 12a, the feed amount $\Delta z$ may be computed in the position x in which a component is not disposed. Generally, the color of the board 12a is previously fixed in brown, green, or the like, and whether the component is disposed in the board 12a can easily be determined by the color image obtained from the second line sensor.

Figure 10A:
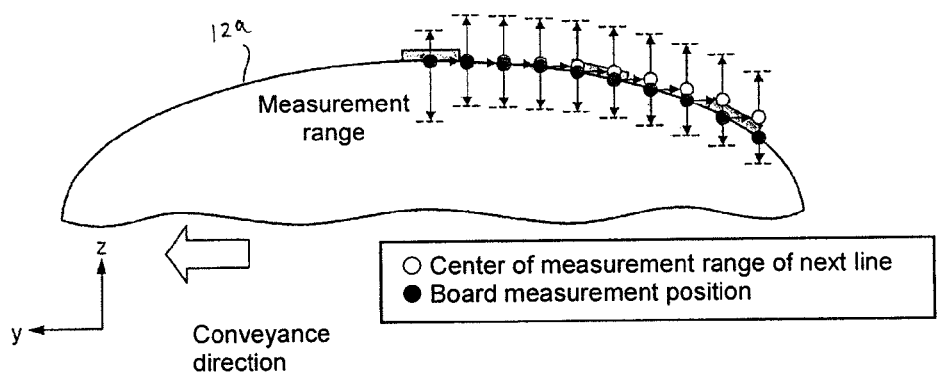
FIG. 10A is a sectional view of the board illustrating a state of a change in measurement range in the three-dimensional shape measuring system according to one or more embodiments of the present invention.
Figure 10B:
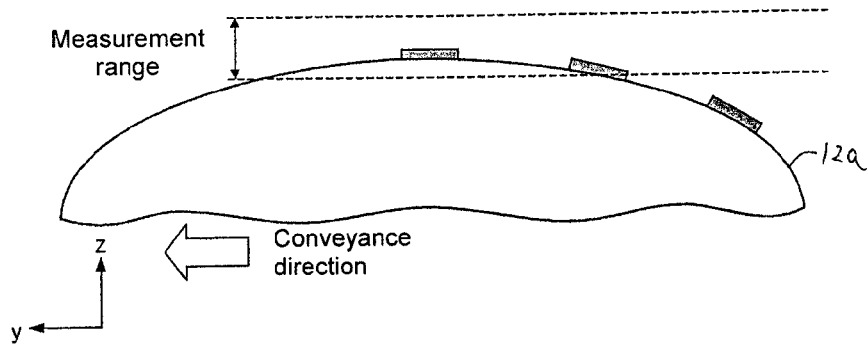
FIG. 10B is a sectional view of the board illustrating a state of a change in measurement range in a conventional three-dimensional shape measuring system according to one or more embodiments of the present invention.

FIG. 10 is a view illustrating the board 12a of FIG. 9 that is cut away in the y-axis direction and viewed in the x-axis direction. FIG. 10A illustrates a state of a change of the measurement range in the three-dimensional shape measuring system 10 of one or more embodiments of the present invention. FIG. 10B illustrates a state of a change of a measurement range in a conventional three-dimensional shape measuring system as a comparative example.

Referring to FIG. 10B, in the conventional example, because of the fixed measurement range, the board 12a and the components disposed on the board 12a can partially be measured, but the remaining components cannot be measured. On the other hand, referring to FIG. 10A, in one or more embodiments of the present invention, because the measurement head 17 is displaced in each time of the scanning such that the height z of the board 12a becomes the center of the measurement range in the next scanning, the board 12a and all the components can be measured.

A processing operation in the three-dimensional shape measuring system 10 having the above configuration will be described below. After transitioning to the calibration mode to perform the calibration, the three-dimensional shape measuring system 10 transitions to the measurement mode to measure the three-dimensional shape of the measurement target 12. Because the processing in the calibration mode is similar to that of the conventional technique, the description thereof is omitted.

Figure 11:
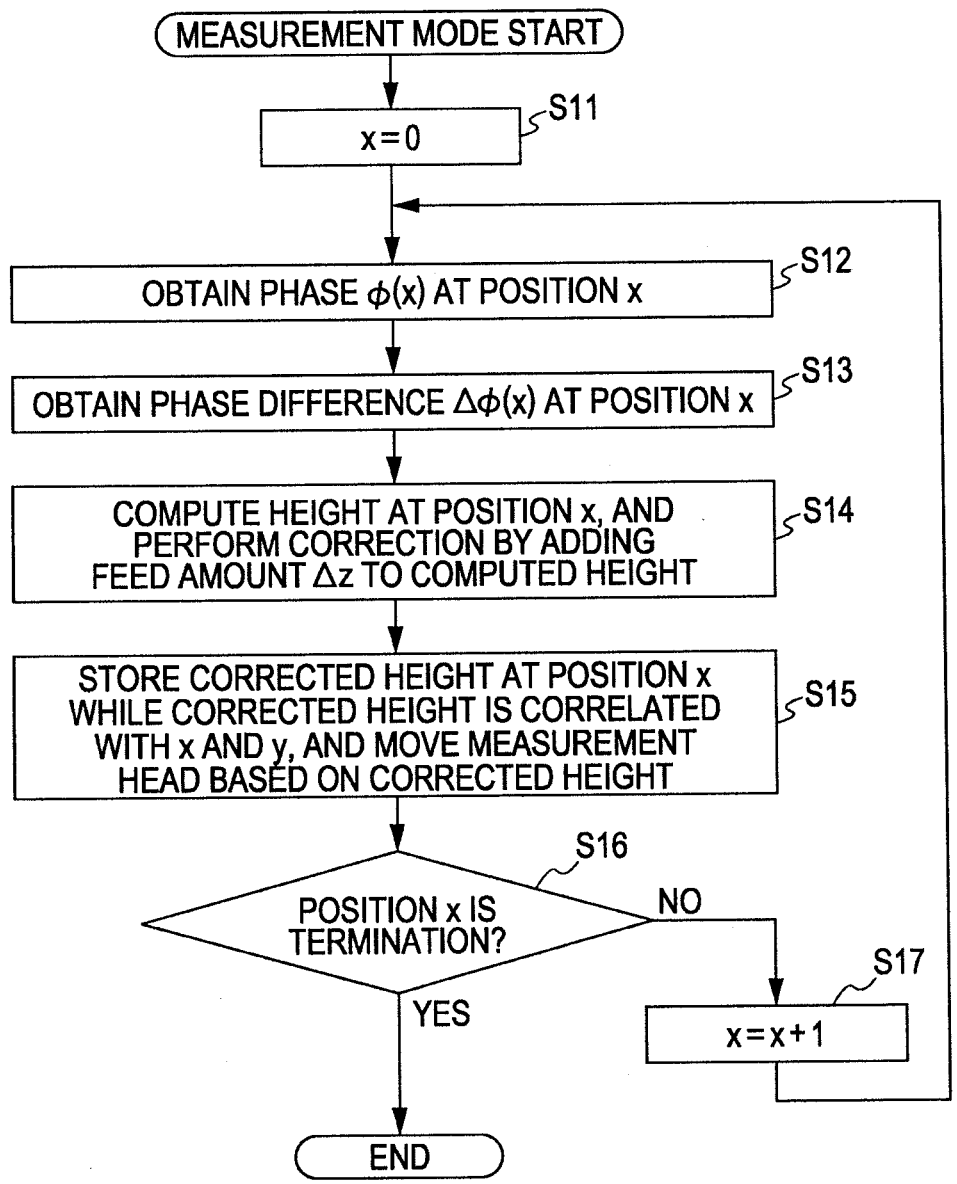
FIG. 11 is a flowchart illustrating a processing operation performed by the control unit in a measurement mode according to one or more embodiments of the present invention.

FIG. 11 illustrates processing that is performed by the control unit 16 in the measurement mode. The control unit 16 sequentially computes the height from one end part toward the other end part in the line image in which the pixels are arrayed in line. Accordingly, the position x of the pixel in the main scanning direction is set to 0 (step S11).

The control unit 16 obtains the phase $\phi(x)$ in the position x (step S12). Specifically, the Hilbert transform portion 74 performs the Hilbert transform to the line image data, in which the background component is removed by the background removing portion 72, based on the equation (6) to which the equation (10) is applied. Using the line image data in which the background component is removed by the background removing portion 72 and the line image data to which the Hilbert transform is performed by the Hilbert transform portion 74, the phase computing portion 75 computes the phase $\phi(x)$ of the optical pattern in the position x based on the equation (4) to which the equation (10) is applied.

The phase difference computing portion 76 subtracts the reference phase $\phi_0(x)$ in the position x, which is obtained by referring to the reference phase DB 63, from the phase $\phi(x)$ in the position x, which is computed by the phase computing portion 75, thereby computing the phase difference $\Delta\phi(x)$ in the position x (step S13).

Then, based on the equation (7), the height computing portion 77 computes the height z in the position x from the phase difference $\Delta\phi(x)$ computed by the phase difference computing portion 76 and the function A(x, z) and the function B(x, z) in the position x, which are obtained by referring to the function DB 61. The height computing portion 77 then corrects the height z by adding the feed amount Δz stored in the feed amount DB 65 to the computed height z (step S14). The height computing portion 77 then stores the corrected height z as the height z of the measurement target 12 in the three-dimensional shape DB 64 while correlating the corrected height z with the coordinate x in the main scanning direction and the coordinate y in the sub-scanning direction (step S15).

Next, the feed amount computing portion 78 controls the z-axis feed mechanism 18 through the z-axis feed control portion 50 such that the measurement target 12 is moved based on the corrected height z (step S15). Specifically, the feed amount computing portion 78 computes the average value of the heights z of the measurement target 12 from the height computing portion 77 with respect to some of or all the positions x, computes the feed amount Δz such that the computed average value becomes the center of the measurement range in the next scanning, and stores the computed feed amount Δz in the feed amount DB 65 while transmitting the feed amount Δz to the z-axis feed control portion 50.

Subsequently, the main control portion 45 determines whether the position x is the termination of the linear line image (step S16). When the position x is the termination of the line image, the processing is ended. On the other hand, when the position x is not the termination of the line image, the value of x is incremented by one in order to deviate the position of the focused pixel by one pixel in the main scanning direction (step S17). Then, the flow returns to step S12.

The height information in each position along the main scanning direction of the measurement target 12 is accumulated in the three-dimensional shape DB 64 by repeating the pieces of processing in steps S12 to S17. In parallel with the image analysis processing, the imaging unit 15 captures the image of the measurement target 12 again while the conveying unit 11 deviates the measurement target 12 in the sub-scanning direction. The image analysis processing is performed again based on the line image obtained by the image capturing. Therefore, the height information in each position along the sub-scanning direction is also sequentially accumulated in the three-dimensional shape DB 64, and the three-dimensional shape information of the whole measurement target 12 is finally accumulated. Alternatively, after the image analysis processing, the imaging unit 15 may capture the image of the measurement target 12 again while the conveying unit 11 deviates the measurement target 12 in the sub-scanning direction.

The height information in each position along the main scanning direction of the measurement target 12 is accumulated in the three-dimensional shape DB 64 by repeating the pieces of processing in steps S12 to S17. After the above processing, the conveying unit 11 deviates the measurement target 12 in the sub-scanning direction, and the imaging unit 15 captures the image of the measurement target 12 again, thereby performing the image analysis processing again based on the line image obtained by the image capturing. Therefore, the height information in each position along the sub-scanning direction is also sequentially accumulated in the three-dimensional shape DB 64, and the three-dimensional shape information of the whole measurement target 12 is finally accumulated.

When the luminance value of the phase-shift optical pattern is fixed in the position x based on the equation (6), the Hilbert transform portion 74 may change the value of the parameter N of the equation (6) through the input and setting portion 47. This means that the number of pixels near the focused pixel is variable in computing the luminance of the phase-shift optical pattern in the position x. In other words, this means that a size of a filter used in the spatial fringe analysis method is variable.

When the value of N is increased (that is, the size of the filter is enlarged), the phase is computed based on more pixels, and computation accuracy of the finally-obtained height information is improved. On the other hand, when the value of N is decreased (i.e., the size of the filter is reduced), the number of computation times necessary to compute Γ̂(x) is decreased to enhance a computation speed. Because a discontinuous point such as a black point is hardly included in the pixel near the focused pixel, an influence of error propagation by the discontinuous point can be suppressed.

The background removing portion 72 may perform pre-processing except the processing of removing the background component to the line image captured by the imaging unit 15. Reduction of a noise included in the line image can be cited as an example of the pre-processing. After the phase computing portion 75 computes the phase, post-processing may be performed to the computed phase. For example, a PLL (Phase Locked Loop) portion is further provided between the phase computing portion 75 and the phase difference computing portion 76 to reduce the error caused by the noise.

The pre-processing may be performed before step S12 of FIG. 11. On the other hand, the post-processing may be performed between steps S12 and S13 of FIG. 11.

As described above, when the height computing portion 77 computes the height z of the measurement target 12, the feed amount computing portion 78 properly computes the feed amount Δz, and the control unit 16 controls the z-axis feed mechanism 18 through the z-axis feed control portion 50 such that the measurement head 17 is moved to the computed feed amount Δz. In this case, although the number of times in which the z-axis feed mechanism 18 moves the measurement head 17 is increased in proportion to the number of times in which the height z of the measurement target 12 is computed, it is not necessary to perform the processing of determining whether the control is performed such that the z-axis feed mechanism 18 moves the measurement head 17 based on the height z of the measurement target 12.

In one or more embodiments of the present invention, the feed amount computing portion 78 computes the feed amount Δz in each time of the scanning to control the z-axis feed mechanism 18 through the z-axis feed control portion 50. However, in the case where the height z of the measurement target 12 has a low change ratio, the feed amount computing portion 78 may compute the feed amount Δz every second time or every third time. In such cases, the number of times in which the z-axis feed mechanism 18 moves the measurement head 17 can be decreased.

When the height z of the measurement target 12, which is computed by the height computing portion 77, reaches the end part in the range in the height direction corresponding to the measurement range, the feed amount computing portion 78 may compute the feed amount Δz to control the z-axis feed mechanism 18 through the z-axis feed control portion 50. As used herein, that the height z of the measurement target 12 reaches the end part is conceivable that the height z of the measurement target 12 almost runs off from the range. When the height z of the measurement target 12 runs off from the range, the height cannot correctly be measured as described above.

On the other hand, according to the above configuration, because the measurement head 17 is moved when the height z of the measurement target 12 almost runs off from the range, the height z of the measurement target 12 can be prevented from running off from the range, and therefore the height z of the measurement target 12 can properly be measured. Compared with one or more embodiments of the present invention, although it is necessary to perform processing of determining whether the measurement head 17 is moved according to the height z of the measurement target 12, the number of times in which the measurement head 17 is moved can be decreased.

The feed amount computing portion 78 computes the feed amount Δz by utilizing the height z of the measurement target 12, which is computed by the current scanning. Alternatively, the height z of the measurement target 12, which is computed by the previous scanning, may be utilized. For example, in the case of the board 12a illustrated in FIG. 9, sometimes the height z of the board 12a cannot accurately be measured because of the scanning of the area where the components are densely disposed. At this point, the feed amount Δz is computed using the heights z of the board 12a, which are computed by the current scanning and the previous scanning, which allows the measurement accuracy to be improved.

A modification of the optical pattern projected to the measurement target 12 will be described below.

In the configuration of the three-dimensional shape measuring system 10 of one or more embodiments of the present invention or an apparatus (hereinafter referred to as a "conventional apparatus") of Patent Document 1 or Non-Patent Document 1 described above, the luminance of the optical pattern projected to the measurement target 12 changes along the main scanning direction of the line sensor 34. At this point, in the conventional apparatus, in order that at least three kinds of optical patterns having the deviated phases are captured while projected to the measurement target, it is necessary that a direction (hereinafter referred to as a "minimum pitch direction") in which the change in luminance of the optical pattern becomes the minimum differ from the main scanning direction of the line sensor. This is because that, when the minimum pitch direction is aligned with the main scanning direction of the line sensor, the phase of the optical pattern projected to the same part of the measurement target is not deviated even if the measurement target is conveyed in the direction perpendicular to the main scanning direction of the line sensor.

On the other hand, in the three-dimensional shape measuring system 10 of one or more embodiments of the present invention, the phase of the optical pattern and the phase difference can be computed based on only one line image, which is obtained by the line sensor 34 capturing the image of the measurement target 12 to which the optical pattern is projected. Accordingly, no trouble is generated even if the minimum pitch direction of the optical pattern is aligned with the main scanning direction of the line sensor 34.

In the line image captured by the line sensor 34, the pitch of the luminance of the optical pattern becomes an important factor to fix the measurement accuracy in performing the height measurement. Specifically, the measurement accuracy is improved with decreasing pitch. In the line image captured by the line sensor 34, the pitch of the luminance of the optical pattern becomes the minimum when the minimum pitch direction of the optical pattern is aligned with the main scanning direction of the line sensor 34. Accordingly, in the three-dimensional shape measuring system 10 of one or more embodiments of the present invention, the minimum pitch direction of the optical pattern projected to the measurement target 12 may be parallel (aligned) with the main scanning direction of the line sensor 34.

Although the measurement accuracy is improved with decreasing pitch of the luminance of the optical pattern, the measurement range of the height is also reduced, and the measurable height is decreased in the conventional method in which the measurement range is fixed. On the other hand, in the three-dimensional shape measuring system 10 of one or more embodiments of the present invention, the measurement head 17 is moved in the height direction based on the height z of the measurement target 12. Therefore, the measurement range is changed, and the computed height is corrected based on the feed amount Δz of the measurement head 17, so that the height z of the measurement target 12 can properly be computed to increase the range of the measurable height.

In the conventional apparatus, in order to capture the image of the optical pattern with the plurality of line sensors, it is necessary to project the optical pattern to the imaging area of each of the plurality of line sensors. In the case where the phototransmitting unit dedicated to each of the plurality of line sensors is provided, the projected optical pattern varies in each phototransmitting unit. Accordingly, one phototransmitting unit is generally provided. However, when only one phototransmitting unit is provided, it is necessary to project the optical pattern that can cover the imaging areas of the plurality of line sensors.

However, in the three-dimensional shape measuring system 10 of one or more embodiments of the present invention, because one line sensor 34 captures the whole area of the measurement target 12, the optical pattern projected by the phototransmitting unit 13 may cover only the imaging area of the one line sensor 34 (the line sensor 34k that captures the image of the luminance component). Therefore, in the three-dimensional shape measuring system 10 of one or more embodiments of the present invention, it is not always necessary that the projected optical pattern be two-dimensionally spread.

In this case, in order to enhance energy efficiency of the optical pattern, the phototransmitting unit 13 may project the optically-collected optical pattern. Specifically, as illustrated in FIGS. 2 and 3, the phototransmitting unit 13 may project the linear-shape optical pattern (strictly having a micro finite width in the sub-scanning direction) in which the light is collected to one axis extending in the main scanning direction of the line sensor 34. In this case, the phototransmitting unit 13 includes a uniaxial collector that uniaxially collects the optical pattern, and the optical pattern may be collected in the linear shape extending in the main scanning direction by the uniaxial collector. The linear-shape optical pattern is projected so as to cover the imaging area of the line sensor 34.

A Fresnel lens or a cylindrical lens can be cited as a specific example of the uniaxial collector. When the Fresnel lens or the cylindrical lens is disposed between the light source 31 and the pattern generating element 32, the uniaxially-collected optical pattern can be projected to the measurement target 12.

A modification of the three-dimensional shape measuring system 10 of one or more embodiments of the present invention will be described below. In the above description, the imaging unit 15 includes four line sensors 34. One or more embodiments of present invention is not limited thereto, and an additional line sensor may be provided. A luminance noise of the line sensor can statistically be reduced by providing the additional line sensor, and stability of the three-dimensional shape measurement can be improved.

In the three-dimensional shape measuring system 10 of one or more embodiments of the present invention, the conveying unit 11, the phototransmitting unit 13, the imaging unit 15, the control unit 16, and the like are separately provided. Some of or all these configurations may integrally be configured. In one or more embodiments of the present invention, the line image is analyzed based on the spatial fringe analysis method. Alternatively, the line image may be analyzed based on the temporal fringe analysis method.

Figure 12:
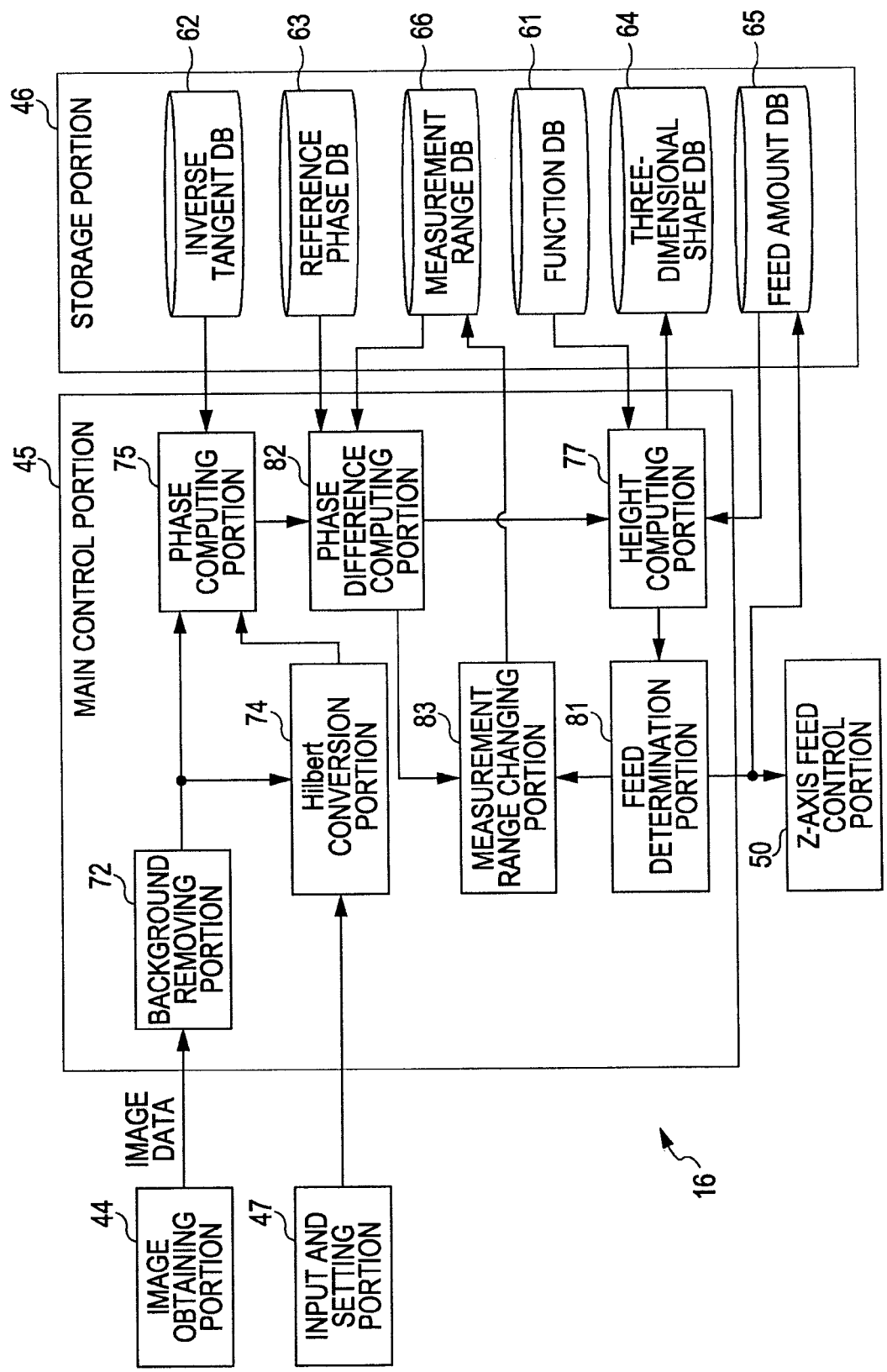
FIG. 12 is a block diagram illustrating a configuration of a main part of a control unit of a three-dimensional shape measuring system according to one or more embodiments of the present invention.

Other embodiments of the present invention will be described below with reference to FIGS. 12 to 14. FIG. 12 illustrates a configuration of a main part of the control unit 16 in a three-dimensional shape measuring system 10 of one or more embodiments of the present invention, particularly a configuration of a main part of the main control portion 45. The three-dimensional shape measuring system 10 of one or more embodiments of the present invention differs from the three-dimensional shape measuring system 10 of FIGS. 1 to 11 in the following points. That is, in the main control portion 45, a feed determination portion (displacement portion control means) 81 is provided instead of the feed amount computing portion 78, and a phase difference computing portion (phase correcting means) 82 is provided instead of the phase difference computing portion 76. Further, a measurement range changing portion (measurement range setting means) 83 and a measurement range DB 66 are added. The other configurations are the same. The same configuration as the above-described embodiments is denoted by the same reference numeral, and the description thereof is omitted.

The feed determination portion 81 determines whether the measurement head 17 should be moved based on the height z of the measurement target 12, which is computed by the height computing portion 77. When determining that the measurement head 17 should be moved, the feed determination portion 81 computes the displacement amount Δz and stores the computed feed amount Δz in the feed amount DB 65 while transmitting the computed feed amount Δz to the z-axis feed control portion 50 and the measurement range changing portion 83. Therefore, the z-axis feed control portion 50 controls the z-axis feed mechanism 18 to displace the measurement head 17 such that the displacement amount of the measurement head 17 becomes the feed amount Δz from the feed determination portion 81.

Specifically, the determination of the feed determination portion 81 is made by computing the average value of the heights z of the measurement target 12 from the height computing portion 77 with respect to some of or all the positions x, and determining whether the computed average value reaches the end part of the range corresponding to the depth of field of the measurement head 17. The feed amount Δz is one in which the computed average value becomes the center of the depth of field in the next time of the scanning. Statistical values such as a mode value and a median value may be used in addition to the average value.

More specifically, the upper side of the end part ranges from an upper limit of the range corresponding to the depth of field to a value that is lower than the upper limit by a half of the range corresponding to the measurement range. The lower side of the end part ranges from a lower limit of the range corresponding to the depth of field to a value that is higher than the lower limit by a half of the range corresponding to the measurement range. A size of the end part can properly be set based on the change ratio of the height z of the measurement target 12, the distance to the position scanned in the next time, and the like. The size of the end part may be a predetermined size, or the size of the end part may be changed according to the change ratio.

The measurement range DB 66 is a database that stores the measurement range indicating the range that the phase φ(x) in the position x corresponding to the currently-analyzed pixel can take. Specifically, the measurement range is a set of the upper limit and the lower limit in the range that the original phase can take in the position x. Alternatively, one or more embodiments of the present invention is not limited thereto, and the measurement range may be a set of the lower limit and a size from the lower limit to the upper limit, or a set of the center of the range and a difference between the center and the upper limit or the lower limit. Therefore, the measurement range can be searched in the position x corresponding to the currently-analyzed pixel.

The phase difference computing portion 82 refers to the reference phase DB 63 to obtain the reference phase $\phi_0(x)$ of the optical pattern in the position x while receiving the phase φ(x) of the optical pattern in the position x from the phase computing portion 75. Then, the phase difference computing portion 82 subtracts the phase $\phi_0(x)$ of the reference plane from the phase (I)(x) of the optical pattern to compute a phase difference $\Delta\phi_p(x)$ of the pre-correction.

Then, the phase difference computing portion 82 refers to the measurement range DB 66 to obtain a measurement range λ. An integer k in which the phase difference $\Delta\phi_p(x)+2k\pi$ takes the value within the measurement range λ is obtained, and the obtained integer k is substituted for the phase difference $\Delta\phi_p(x)+2k\pi$ to obtain a correction phase difference Δφ(x). The phase difference computing portion 82 transmits the correction phase difference Δφ(x) as the computed phase difference Δφ(x) to the height computing portion 77 and the measurement range changing portion 83.

The measurement range changing portion 83 changes the measurement range stored in the measurement range DB 66. Specifically, the measurement range changing portion 83 receives the correction phase difference Δφ(x) in the position x from the phase difference computing portion 82. The measurement range changing portion 83 computes the pixel analyzed in the next, namely, the measurement range of the corresponding position in the next time of the scanning using the correction phase difference Δφ(x), and updates the measurement range DB 66 to the computed measurement range.

When the measurement head 17 is displaced, the measurement range is also displaced. When receiving the feed amount Δz from the feed determination portion 81, the measurement range changing portion 83 changes the measurement range based on the received feed amount Δz, and updates the measurement range DB 66 to the changed measurement range.

At this point, that the height z of the measurement target 12 reaches the end part is conceivable that the height z of the measurement target 12 almost runs off from the range corresponding to the depth of field. When the height z of the measurement target 12 runs off from the range, the image captured by the measurement head 17 becomes defocused, and the height cannot be correctly measured.

On the other hand, in one or more embodiments of the present invention, when the height z of the measurement target 12 almost runs off from the range, the measurement head 17 can be moved to prevent the height z of the measurement target 12 from running off from the range. As a result, the height of the measurement target 12 can properly be measured. Because the depth of field is wider than the measurement range, the number of moving times can be decreased compared with the case where the measurement head 17 is moved based on the measurement range.

Even if the phase difference corresponding to the height from the reference plane exceeds 2π, usually there is a low probability that the phase difference between the pixels located close to each other exceeds 2π. Accordingly, in one or more embodiments of the present invention, the phase difference computing portion 82 corrects the phase difference with respect to a certain pixel based on the measurement range, and sets the measurement range of the pixel scanned in the next based on the corrected phase difference and the feed amount Δz. Therefore, there is a low possibility that the phase difference runs off from the measurement range. As a result, the case where the phase difference is located in the range corresponding to the depth of field can be dealt with even if the original phase becomes 2π or more.

Figure 13:
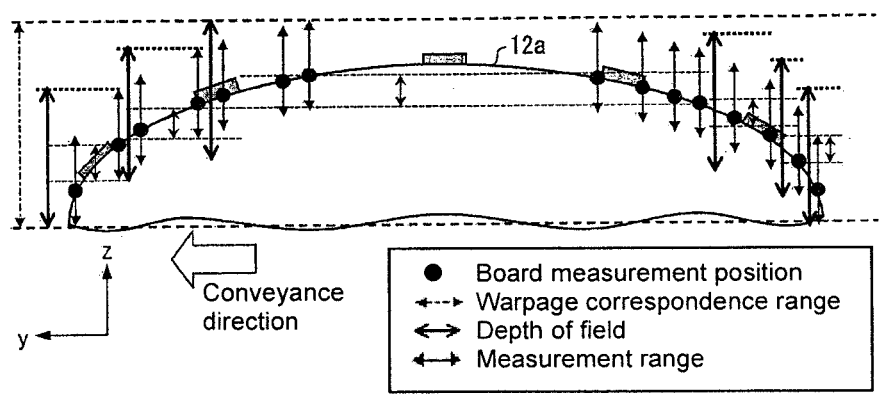
FIG. 13 is a sectional view of the board, and is a view illustrating a state of a change in measurement range in the three-dimensional shape measuring system according to one or more embodiments of the present invention.
Figure 14:
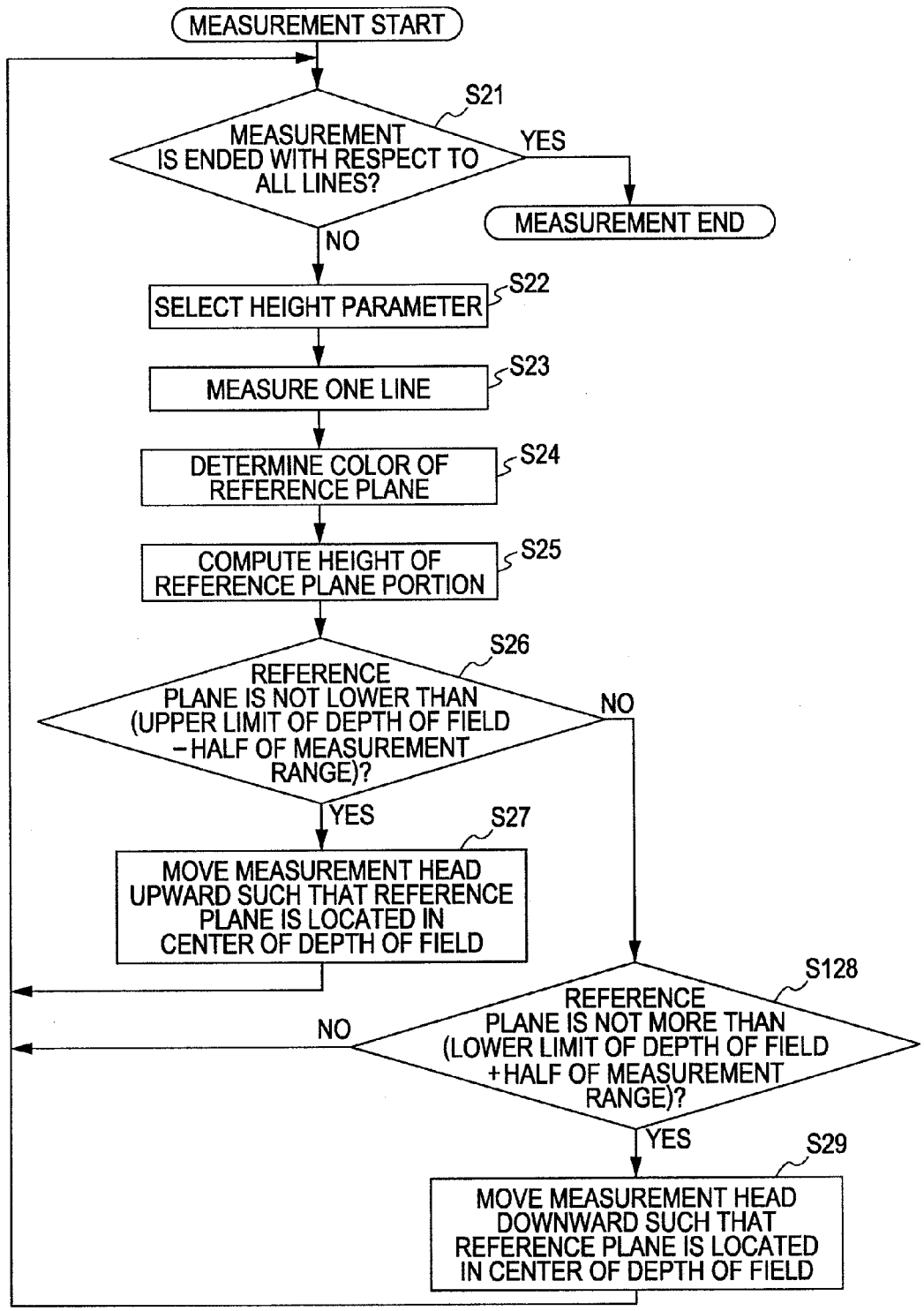
FIG. 14 is a flowchart illustrating a processing operation performed by the control unit in the measurement mode according to one or more embodiments of the present invention.

FIG. 13 is a view illustrating the board 12a of FIG. 9 that is cut away in the y-axis direction and viewed in the x-axis direction, and illustrates a state of the change in the depth of field and the measurement range in the three-dimensional shape measuring system 10 of one or more embodiments of the present invention. In FIG. 13, a long and bold line indicates the depth of field, and a thin line indicates the measurement range. A short and bold line indicates the range except the end part in the depth of field.

Accordingly, as illustrated in FIG. 13, the change in measurement range is dealt with by changing the measurement range in the case where the height z of the board 12a is located within the range of the short and bold line, and the change in measurement range is dealt with by changing the depth of field and the measurement range by moving the measurement head 17 in the case where the height z of the board 12a exceeds the range of the short and bold line. As a result, the measurement head 17 is moved only five times in the example of FIG. 13.

A processing operation of the measurement mode in the three-dimensional shape measuring system 10 of the above configuration will be described below. FIG. 14 illustrates processing performed by the control unit 16 in the measurement mode. Whether the measurement is ended with respect to all lines is determined (step S21). When the measurement is ended with respect to all lines, the processing is ended.

On the other hand, when the measurement is not ended with respect to all lines, each block selects various height parameters that are the parameters used to compute the height z of the measurement target 12 (step S22). For example, in the case of the phase difference computing portion 82, the measurement range is obtained from the measurement range DB 66.

The height z is measured in each position x of one line by performing the scanning (step S23). Specifically, the pieces of processing in step S11 to S17 of FIG. 11 except the processing of moving the measurement head 17 are performed.

The height computing portion 77 determines whether each position x of one line is the reference plane, namely, the plane that becomes the reference in the measurement target 12 (in the example of FIG. 13, the surface of the board 12a) based on the color of the color image (step S24). Then, the height computing portion 77 computes the average value of the heights z in the positions x determined to be the reference plane (step S25).

The feed determination portion 81 then determines whether the average value of the heights of the computed reference plane is located above the end part, namely, the average value is larger than (upper limit of range corresponding to depth of field)−(half of range corresponding to measurement range) (step S26). The flow goes to step S27 when the average value is larger, and the flow goes to step S28 in other cases.

In step S27, the feed determination portion 81 controls the z-axis feed mechanism 18 through the z-axis feed control portion 50 to upwardly move the measurement head 17 such that the average value of the heights of the reference plane becomes the center of the depth of field. Then, the flow returns to step S21 to repeat the above operation.

In step S28, the feed determination portion 81 determines whether the average value of the heights of the computed reference plane is located below the end part, namely, the average value is smaller than (lower limit of range corresponding to depth of field)+(half of range corresponding to measurement range). The flow goes to step S29 when the average value is smaller, and the flow goes to step S21 to repeat the above operation in other cases.

In step S29, the feed determination portion 81 controls the z-axis feed mechanism 18 through the z-axis feed control portion 50 to downwardly move the measurement head 17 such that the average value of the heights of the reference plane becomes the center of the depth of field. Then, the flow returns to step S21 to repeat the above operation.

The present invention is not limited to the above embodiments, and various changes can be made without departing from the scope of claims. That is, the embodiment obtained by a combination of technical means that are appropriately changed within the scope described in claims is also included in the technical field of the present invention.

For example, in one or more embodiments of the present invention, the upper surface of the conveying table 41 is set to the reference plane, and the measurement target 12 is placed on the reference plane. However, the measurement target 12 that is not suitable to such placement exists in the measurement targets 12. In such cases, the measurement target 12 may be attached while separated from the reference plane.

An example of such a measurement target 12 includes a circuit board in which many electronic components are mounted on both the surfaces thereof. In this case, a retaining member that detachably retains both ends of a board part of the circuit board while separating the circuit board from the upper surface of the conveying table 41 may be provided in the conveying table 41. At this point, the actual height of the circuit board can be computed by previously specifying the distance from the upper surface (reference plane) of the conveying table 41 to the upper surface of the circuit board having no warpage.

In one or more embodiments of the present invention, the conveying unit 11 is configured to move the measurement target 12. Alternatively, the measurement head 17 may be moved in the sub-scanning direction and the main scanning direction instead of moving the measurement target 12. That is, the conveying unit 11 may relatively move the measurement target 12 with respect to the measurement head 17.

In one or more embodiments of the present invention, the measurement head 17 is moved in the z-axis direction. Alternatively, the conveying table 41 may be moved in the z-axis direction or both the measurement head 17 and the conveying table 41 may be moved in the z-axis direction. In one or more embodiments of the present invention, the line sensor 34 is used in the imaging unit 15. Alternatively, an area camera may be used instead of the line sensor.

One or more embodiments of present invention can also be expressed as follows. As described above, in the three-dimensional shape measuring system according to one or more embodiments of the present invention, the displacement portion control means may cause the displacement portion to perform the displacement when the height computing means computes the height of the measurement target. In this case, the number of times in which the displacement portion performs the displacement is increased in proportion to the number of times in which the height of the measurement target is computed. However, it is not necessary to perform the processing for determining whether the displacement is performed according to the height of the measurement target. When the height computing means computes the height of the measurement target, the displacement portion control means may cause the displacement portion to perform the displacement, every time, every second time, or every third time.

In the three-dimensional shape measuring apparatus according to one or more embodiments of the present invention, the displacement portion control means may cause the displacement portion to perform the displacement when the height of the measurement target, which is computed by the height computing means, reaches the end part in the range in the height direction corresponding to the measurement range indicating the range that the phase can take.

At this point, that the height of the measurement target reaches the end part is conceivable that the height of the measurement target is almost runs off from the range in the height direction corresponding to the measurement range. When the height of the measurement target runs off from the range, the height cannot correctly be measured.

On the other hand, according to the configuration of one or more embodiments of the present invention, when the height of the measurement target almost runs off from the range, the displacement portion can perform the displacement to prevent the height of the measurement target from running off from the range, and therefore the height can correctly be measured. When the height of the measurement target is computed, it is necessary to perform the processing for determining whether the displacement is performed according to the height of the measurement target compared with the case where the displacement portion is caused to perform the displacement. However, the number of times in which the displacement portion performs the displacement can be decreased.

In the three-dimensional shape measuring apparatus according to one or more embodiments of the present invention, the displacement portion control means causes the displacement portion to perform the displacement when the height of the measurement target, which is computed by the height computing means, reaches the end part in the range corresponding to the depth of field of the measurement head. The three-dimensional shape measuring apparatus according to one or more embodiments of the present invention further includes phase correcting means for correcting the phase computed by the phase computing means based on measurement range indicating the range that the phase can take. The height computing means computes the height based on the phase corrected by the phase correcting means and corrects the computed height based on the displacement amount, thereby computing the height of the measurement target. The three-dimensional shape measuring apparatus according to one or more embodiments of the present invention may further include measurement range setting means for setting the measurement range based on the phase corrected by the phase correcting means and the displacement amount.

At this point, that the height of the measurement target reaches the end part is conceivable that the height of the measurement target almost runs off from the range corresponding to the depth of field. When the height of the measurement target runs off from the range, the correct height may not be measured because the image captured by the measurement head becomes defocused.

On the other hand, according to the configuration of one or more embodiments of the present invention, when the height of the measurement target almost runs off from the range, the displacement portion performs the displacement, so that the height of the measurement target can be prevented from running off from the range, and therefore the height can be reliably measured. Because the depth of field is wider than the measurement range, the number of times in which the displacement portion performs the displacement can be decreased compared with the case where the displacement portion is caused to perform the displacement based on the measurement range.

Meanwhile, even if the phase difference corresponding to the height from the reference plane exceeds $2\pi$, usually there is a low probability that the phase difference between the pixels located close to each other exceeds $2\pi$. Accordingly, in the configuration of one or more embodiments of the present invention, the phase is corrected with respect to a certain pixel based on the measurement range, and the measurement range of the pixel scanned in the next is set based on the corrected phase and the feed amount. Therefore, there is a low possibility that the phase runs off from the measurement range. As a result, the case where the phase is located in the range corresponding to the depth of field can be dealt with even if the original phase becomes $2\pi$ or more.

The size of the end part can properly be set based on the inclination of the measurement target, the distance to the position scanned in the next time, and the like. The size of the end part may be a predetermined size, or the size of the end part may be changed according to the inclination of the measurement target, for example.

The height measured with respect to a certain pixel includes a noise and an error. Therefore, although the measurement range may be set based on the computation result relating to the previously-measured one pixel, the measurement range is desirably set based on the computation result relating to the plurality of previously-measured pixels. Desirably, the determination whether the height of the measurement target reaches the end part is made in the same way.

In the above setting, the corrected phase may be set to the center of the measurement range, the corrected phase may be set to the lower limit of the measurement range when the height of the measurement target tends to rise, or the corrected phase may be set to the upper limit of the measurement range when the height of the measurement target tends to fall. Similarly, the measurement range may be set to the center of the set reference plane, the measurement range may be set to the lower limit when the height of the measurement target tends to rise, or the measurement range may be set to the upper limit when the height of the measurement target tends to fall.

Usually, in the case where the three-dimensional shape measuring apparatus is used to inspect the component, because the rough size of the component is previously fixed, the measurement range is also fixed in each position of the component.

Accordingly, the position of the measurement target and the measurement range are stored in the storage portion while correlated with each other, the position of the measurement target corresponding to the pixel is specified, the measurement range corresponding to the specified position is read from the storage portion, and the phase may be corrected based on the read measurement range. In this case, because the measurement range is set according to the position of the measurement target, there is a low possibility that the phase runs off from the measurement range. As a result, the case where the original phase becomes $2\pi$ or more can also be dealt with.

The captured image of the optical pattern includes the image of the measurement target as the background component in addition to the image of the optical pattern. In the case where the optical pattern and the background component are hardly distinguished from each other, the error of the phase of the optical pattern, which is computed by the phase computing means, is increased to make the correct measurement of the height of the measurement target difficult to perform.

Therefore, in the three-dimensional shape measuring apparatus according to one or more embodiments of the present invention, the measurement head includes the first line sensor that captures the image of the optical pattern illumination area that is the area to which the optical pattern is projected in the measurement target and the second line sensor that captures the image of the optical pattern non-illumination area that is the area to which the optical pattern is not projected in the measurement target. The image used by the phase computing means may be one in which the background component is removed from the image captured by the first line sensor using the image captured by the second line sensor.

In this case, because the image in which the background component is removed can be obtained, the phase computing means can accurately compute the phase of the optical pattern, and the height of the measurement target can accurately be measured. Because the background component can be removed by one-time scanning, the height of the measurement target can promptly be measured. The second line sensor may include three line sensors that capture the red, green, and blue images, respectively.

Lastly, each functional block of the control unit 16, particularly the main control portion 45 may be constructed by a hardware logic or software using a CPU as described below.

That is, the control unit 16 includes a CPU that executes a command of a control program achieving each function, a ROM in which the program is stored, a RAM in which the program is expanded, and a storage device (recording medium) such as a memory in which the program and various pieces of data are stored. The recording medium, in which a program code (executable format program, intermediate code program, and source program) of the control program of the control unit 16 as the software achieving the above functions is stored while being readable by the computer, is supplied to the control unit 16, and the computer (or CPU or MPU) reads and executes the program code recorded in the recording medium.

Examples of the recording mediums include tape systems such as a magnetic tape and a cassette tape, disk systems including magnetic disks such as Floppy (registered trademark) disk/hard disk and optical disks such as CD-ROM/MO/MD/DVD/CD-R, card systems such as IC card (including memory card)/optical card, and semiconductor memory systems such as mask ROM/EPROM/EEPROM/flash ROM.

The control unit 16 is configured to be able to be connected to the communication network, and the program code may be supplied through a communication network. The communication network is not particularly limited, and for example, the Internet, an intranet, an extranet, a LAN, an ISDN, a VAN, a CATV communication network, a virtual private network, a telephone line network, a mobile communication network, and a satellite communication network can be used. A transmission medium constituting the communication network is not particularly limited, and for example, wired lines such as IEEE1394, a USB, a power-line carrier, a cable TV line, a telephone line, and an ADSL line and wireless lines such as an infrared line such as IrDA and a remote controller, Bluetooth (registered trademark), 802.11 wireless, HDR, a mobile communication network, a satellite communication line, and a terrestrial broadcasting network can be used. One or more embodiments of present invention may be achieved in the form of a computer data signal in which the program code is embodied by electronic transmission and embedded in a carrier.

The specific embodiments or examples described in order to describe the invention are made only by demonstrating the technological contents of the present invention, but the present invention should not be construed to be limited solely to such a specific example. Various changes can be made without departing from the spirit and the scope of the present invention.

According to one or more embodiments of the present invention, the measurable height can simply be expanded while the measurement range is maintained, so that one or more embodiments of the present invention can suitably be applied to the image inspection apparatus that inspects the mounting board, for example.

DESCRIPTION OF SYMBOLS

10 three-dimensional shape measuring system (three-dimensional shape measuring apparatus)
11 conveying unit
12 measurement target
13 phototransmitting unit
14 optical pattern
15 imaging unit
16 control unit
17 measurement head
18 z-axis feed mechanism (displacement portion)
31 light source
32 pattern generating element
33 optical system
34 line sensor
35 optical unit
41 conveying table (mounting stage)
42 servo motor
43 linear scaler
44 image obtaining portion
45 main control portion
46 storage portion
47 input and setting portion
48 conveyance control portion
49 phototransmission control portion
50 z-axis feed control portion (displacement portion control means)
72 background removing portion
74 Hilbert conversion portion
75 phase computing portion (phase computing means)
76 phase difference computing portion
77 height computing portion (height computing means)
78 feed amount computing portion (displacement portion control means)
81 feed determination portion (displacement portion control means)
82 phase difference computing portion (phase correcting means)
83 measurement range changing portion (measurement range setting means)

While the invention has been described with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

The invention claimed is:

1. A three-dimensional shape measuring apparatus that measures a three-dimensional shape of a measurement target by analyzing an optical pattern projected to the measurement target, luminance of the optical pattern periodically changing according to a position, the three-dimensional shape measuring apparatus comprising:

a mounting stage to which the measurement target is attached, the mounting stage having a reference plane that becomes a reference of a height of the measurement target;

a measurement head that projects the optical pattern to the measurement target and the reference plane and captures images of the projected optical patterns;

a displacement portion that displaces at least one of the mounting stage and the measurement head in a height direction of the measurement target;

phase computing means for computing a phase of the optical pattern in a certain pixel included in the image captured by the measurement head;

height computing means for computing a height of the measurement target based on the phase computed by the phase computing means; and displacement portion control means for controlling the displacement portion based on the height of the measurement target computed by the height computing means, wherein the height computing means computes the height based on the phase computed by the phase computing means, and corrects the computed height based on a displacement amount displaced by the displacement portion from the reference plane of the mounting stage to the height of the measurement head, thereby computing the height of the measurement target.

2. The three-dimensional shape measuring apparatus according to claim 1, wherein the displacement portion control means causes the displacement portion to perform the displacement when the height computing means computes the height of the measurement target.

3. The three-dimensional shape measuring apparatus according to claim 1, wherein the displacement portion control means causes the displacement portion to perform the displacement when the height of the measurement target computed by the height computing means reaches an end part of a range in a height direction corresponding to a measurement range indicating a range that the phase can take.

4. The three-dimensional shape measuring apparatus according to claim 1, wherein the displacement portion control means causes the displacement portion to perform the displacement when the height of the measurement target computed by the height computing means reaches an end part of a range corresponding to a depth of field of the measurement head, wherein the three-dimensional shape measuring apparatus further comprises:

phase correcting means for correcting the phase computed by the phase computing means based on a measurement range indicating a range that the phase can take, wherein the height computing means computes the height based on the phase corrected by the phase correcting means, and corrects the computed height based on the displacement amount, thereby computing the height of the measurement target, and wherein the three-dimensional shape measuring apparatus further comprises:

measurement range setting means for setting the measurement range based on the phase corrected by the phase correcting means and the displacement amount.

5. The three-dimensional shape measuring apparatus according to claim 1, wherein the measurement head comprises:

a first line sensor that captures an image of an optical pattern illumination area, wherein the optical pattern illumination area is an area to which the optical pattern is projected in the measurement target; and a second line sensor that captures an image of an optical pattern non-illumination area, wherein the optical pattern non-illumination area is an area to which the optical pattern is not projected in the measurement target, and wherein, in the image utilized by the phase computing means, a background component is removed from the image captured by the first line sensor by utilizing the image captured by the second line sensor.

6. A three-dimensional shape measuring method for a three-dimensional shape measuring apparatus that measures a three-dimensional shape of a measurement target by analyzing an optical pattern projected to the measurement target, luminance of the optical pattern periodically changing according to a position, the three-dimensional shape measuring method comprising:

a phase computing step of projecting the optical pattern to the measurement target and a reference plane included in a mounting stage to which the measurement target is attached, wherein the reference plane becoming a reference of a height of the measurement target, and wherein the phase computing step computes a phase of the optical pattern in a certain pixel included in the image captured by a measurement head, wherein the measurement head captures an image of the projected optical pattern;

a height computing step of computing a height of the measurement target based on the phase computed in the phase computing step; and a displacement portion control step of controlling a displacement portion, which displaces at least one of the mounting stage and the measurement head in a height direction of the measurement target, based on the height of the measurement target, the height of the measurement target being computed in the height computing step, wherein, in the height computing step, the height is computed based on the phase computed in the phase computing step, and the computed height is corrected based on a displacement amount displaced by a displacement portion from the reference plane of the mounting stage to the height of the measurement head, thereby computing the height of the measurement target.

7. A non-transitory computer-readable medium storing a three-dimensional shape measuring program that operates a three-dimensional shape measuring apparatus that measures a three-dimensional shape of a measurement target by analyzing an optical pattern projected to the measurement target, luminance of the optical pattern periodically changing according to a position, the three-dimensional shape measuring program causing a computer to execute:

a phase computing step of projecting the optical pattern to the measurement target and a reference plane included in a mounting stage to which the measurement target is attached, wherein the reference plane becoming a reference of a height of the measurement target, and wherein the phase computing step computes a phase of the optical pattern in a certain pixel included in an image captured by a measurement head, wherein the measurement head captures the image of the projected optical pattern;

a height computing step of computing a height of the measurement target based on the phase computed in the phase computing step; and a displacement portion control step of controlling a displacement portion, which displaces at least one of the mounting stage and the measurement head in a height direction of the measurement target, based on the height of the measurement target computed by the height computing step, wherein, in the height computing step, the height is computed based on the phase computed in the phase computing step, and the computed height is corrected based on a displacement amount displaced by a displacement portion from the reference plane of the mounting stage to the height of the measurement head, thereby computing the height of the measurement target.

8. The three-dimensional shape measuring apparatus according to claim 2, wherein the measurement head comprises:

a first line sensor that captures an image of an optical pattern illumination area,
wherein the optical pattern illumination area is an area to which the optical pattern is projected in the measurement target; and a second line sensor that captures an image of an optical pattern non-illumination area,
wherein the optical pattern non-illumination area is an area to which the optical pattern is not projected in the measurement target, and wherein, in the image utilized by the phase computing means, a background component is removed from the image captured by the first line sensor by utilizing the image captured by the second line sensor.

9. The three-dimensional shape measuring apparatus according to claim 3, wherein the measurement head comprises:

a first line sensor that captures an image of an optical pattern illumination area,
wherein the optical pattern illumination area is an area to which the optical pattern is projected in the measurement target; and a second line sensor that captures an image of an optical pattern non-illumination area,
wherein the optical pattern non-illumination area is an area to which the optical pattern is not projected in the measurement target, and wherein, in the image utilized by the phase computing means, a background component is removed from the image captured by the first line sensor by utilizing the image captured by the second line sensor.

10. The three-dimensional shape measuring apparatus according to claim 4, wherein the measurement head comprises:

a first line sensor that captures an image of an optical pattern illumination area,
wherein the optical pattern illumination area is an area to which the optical pattern is projected in the measurement target; and a second line sensor that captures an image of an optical pattern non-illumination area,
wherein the optical pattern non-illumination area is an area to which the optical pattern is not projected in the measurement target, and wherein, in the image utilized by the phase computing means, a background component is removed from the image captured by the first line sensor by utilizing the image captured by the second line sensor.

* * * * *